(12) United States Patent
Lee et al.

(10) Patent No.: US 10,449,832 B2
(45) Date of Patent: Oct. 22, 2019

(54) VEHICLE AIR CONDITIONER SYSTEM

(71) Applicant: Hanon Systems, Dajeon (KR)

(72) Inventors: Hae-Jun Lee, Daejeon (KR); Sangmin Lee, Daejeon (KR); Yong Nam Ahn, Daejeon (KR); Jun Young Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 173 days.

(21) Appl. No.: 15/039,600

(22) PCT Filed: Jul. 22, 2015

(86) PCT No.: PCT/KR2015/007622
§ 371 (c)(1),
(2) Date: May 26, 2016

(87) PCT Pub. No.: WO2016/013869
PCT Pub. Date: Jan. 28, 2016

(65) Prior Publication Data
US 2017/0246933 A1    Aug. 31, 2017

(30) Foreign Application Priority Data

Jul. 24, 2014    (KR) .................. 10-2014-0093747
Jul. 24, 2014    (KR) .................. 10-2014-0093770

(51) Int. Cl.
*B60H 1/00*    (2006.01)
*B60H 1/32*    (2006.01)
(Continued)

(52) U.S. Cl.
CPC ....... *B60H 1/3227* (2013.01); *B60H 1/00335* (2013.01); *B60H 1/00342* (2013.01); *F28F 3/086* (2013.01)

(58) Field of Classification Search
CPC .. F25B 1/00; F25B 39/00; F25B 39/04; F25B 2339/00; F25B 2339/043; F25B 2339/047;
(Continued)

(56) References Cited

U.S. PATENT DOCUMENTS 4,589,265 A * 5/1986 Nozawa ................ F25B 39/024
165/152
5,245,843 A * 9/1993 Shimoya .............. B60H 1/3227
62/513

(Continued)

FOREIGN PATENT DOCUMENTS

DE    19646349 B4 *    8/2011    ......... B60H 1/00342
FR    2846734 A1 *    5/2004    ......... B60H 1/00342
(Continued)

OTHER PUBLICATIONS

Machine Translation JP2008180485A.*
(Continued)

*Primary Examiner* — Keith M Raymond
*Assistant Examiner* — Gustavo A Hincapie Serna
(74) *Attorney, Agent, or Firm* — Shumaker, Loop & Kendrick, LLP; James D. Miller

(57) ABSTRACT

Provided is an air conditioner system for a vehicle. The air conditioner system for a vehicle includes a compressor, an integral condenser in which a water cooling region and an air cooling region are formed integrally with each other, an expansion valve, and an evaporator, wherein the water cooling region and the air cooling region of the integral condenser are formed on one plate, such that existing air cooling and water cooling condensers may be formed integrally with each other through one-time brazing coupling, thereby reducing a package and simplifying assembling and manufacturing processes.

22 Claims, 20 Drawing Sheets

(51) Int. Cl.
*F25B 1/00* (2006.01)
*F28D 9/00* (2006.01)
*F28F 3/02* (2006.01)
*F28F 3/08* (2006.01)
*F25B 39/04* (2006.01)
*F28D 21/00* (2006.01)

(58) Field of Classification Search
CPC .... F25B 2500/00; F25B 2500/18; F28D 9/00; F28D 9/0031; F28D 9/0037; F28D 9/0043; F28D 9/005; F28D 9/0093; F28D 2021/0082; F28D 2021/0084; F28F 3/00; F28F 3/025; F28F 3/08; F28F 3/086; F28F 3/12; B60H 1/00335; B60H 1/00342; B60H 1/32; B60H 1/3227
USPC ................ 165/144, 164, 166, 167, 168, 170
See application file for complete search history.

(56) References Cited

U.S. PATENT DOCUMENTS

| | | | | |
|---|---|---|---|---|
| 5,632,161 | A * | 5/1997 | Shimoya | F25B 39/022 62/113 |
| 5,678,419 | A * | 10/1997 | Sanada | B60H 1/3227 62/196.4 |
| 5,678,422 | A * | 10/1997 | Yoshii | F25B 39/022 165/153 |
| 6,032,470 | A * | 3/2000 | Haselden | F28D 9/0043 62/114 |
| 6,082,449 | A * | 7/2000 | Yamaguchi | F28D 9/0075 165/153 |
| 7,041,407 | B2 * | 5/2006 | Yang | H01M 8/0247 429/437 |
| 7,178,585 | B1 * | 2/2007 | Mehendale | F28D 1/0333 165/153 |
| 7,762,090 | B2 * | 7/2010 | Lee | B01D 5/0015 165/113 |
| 9,267,743 | B2 * | 2/2016 | Sugimoto | H05K 7/20581 |
| 9,429,367 | B2 * | 8/2016 | Jouanny | F28D 9/005 |
| 9,494,350 | B2 * | 11/2016 | Kadle | F25B 1/00 |
| 9,534,849 | B2 * | 1/2017 | Kim | F28D 1/0426 |
| 9,846,000 | B2 * | 12/2017 | Meguriya | F28F 3/08 |
| 9,851,154 | B2 * | 12/2017 | Kim | B60H 1/00342 |
| 2006/0053833 | A1 * | 3/2006 | Martins | F25B 39/04 62/507 |
| 2011/0232868 | A1 * | 9/2011 | Iwasaki | F28D 1/0452 165/104.13 |
| 2013/0146265 | A1 | 6/2013 | Kim | |

FOREIGN PATENT DOCUMENTS

| | | | |
|---|---|---|---|
| FR | 3000183 A1 | 6/2014 | |
| JP | 2008180485 A * | 8/2008 | |
| KR | 10-1998-0073360 A | 11/1998 | |
| KR | 20-0264555 Y1 | 2/2002 | |
| KR | 10-1318644 B1 | 10/2013 | |
| WO | WO-2012143429 A1 * | 10/2012 | F28D 9/005 |

OTHER PUBLICATIONS

Machine Translation of: FR2846734A1, (Year: 2004).*
Machine Translation of: WO2012143429A1 (Year: 2012).*
Machine Translation of: DE19646349B4 (Year: 2011).*

* cited by examiner

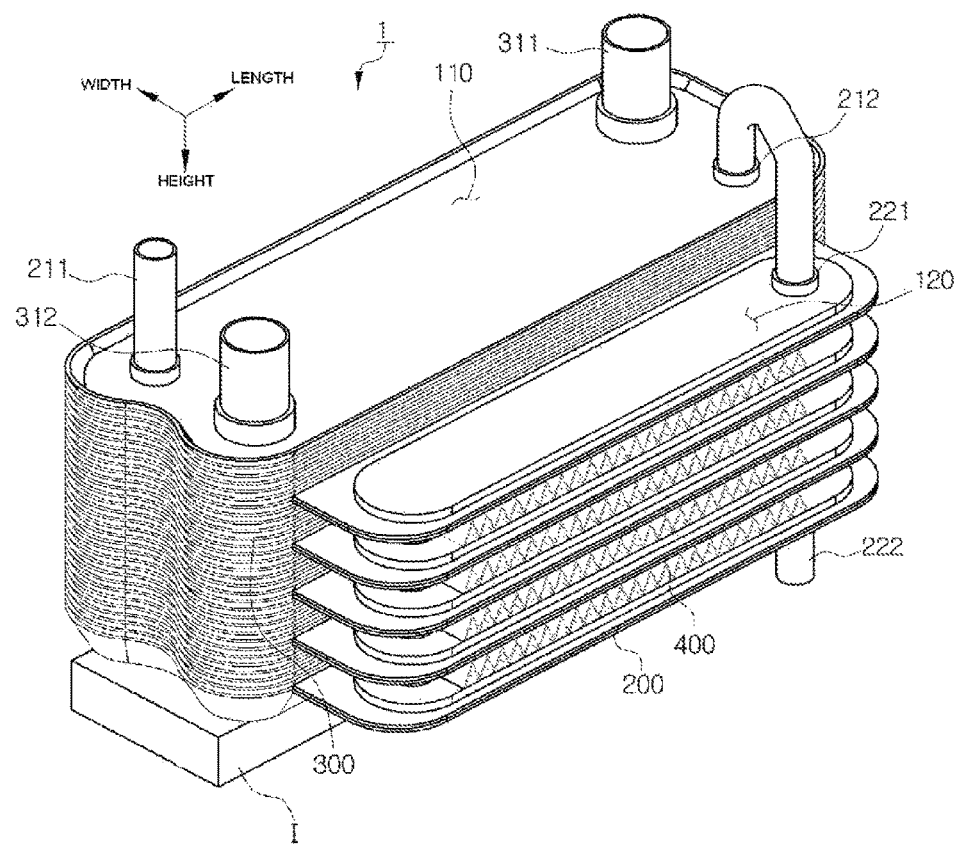
[FIG. 31]

VEHICLE AIR CONDITIONER SYSTEM

CROSS-REFERENCE TO RELATED APPLICATIONS

This application is a United States national phase patent application based on PCT/KR2015/007622 filed Jul. 22, 2015, which claims the benefit of Korean Patent Application No. 10-2014-0093747 filed Jul. 24, 2014 and Korean Patent Application No. 10-2014-0093770 filed Jul. 24, 2014. The disclosures of the above patent applications are hereby incorporated herein by reference in their entirety.

TECHNICAL FIELD

The present invention relates to an air conditioner system for a vehicle, and more particularly, to an air conditioner system for a vehicle including a compressor, an integral condenser in which a water cooling region and an air cooling region are formed integrally with each other, an expansion valve, and an evaporator, wherein the water cooling region and the air cooling region of the integral condenser are formed on one plate, such that existing air cooling and water cooling condensers may be formed integrally with each other through one-time brazing coupling, thereby reducing a package and simplifying assembling and manufacturing processes.

BACKGROUND ART

In a refrigeration cycle of a general air conditioner for a vehicle, an actual cooling action is generated by an evaporator in which a liquid-phase heat exchange medium is vaporized by absorbing an amount of heat corresponding to heat of vaporization from the surrounding. A gas-phase heat exchange medium introduced from the evaporator into a compressor is compressed at a high temperature and a high pressure in the compressor, heat of liquefaction is discharged to the surrounding in a process in which the compressed gas-phase heat exchange medium is liquefied while passing through a condenser, the liquefied heat exchange medium passes through an expansion valve to become a low-temperature and low-pressure wet saturated steam state, and is then introduced again into the evaporator to be vaporized, thereby forming a cycle.

That is, a high-temperature and high-pressure gas-phase refrigerant is introduced into the condenser, is condensed in a liquid state while discharging heat of liquefaction in the condenser by heat exchange, and is then discharged from the condenser, and the condenser may be divided into an air cooling condenser using air as a heat exchange medium cooling the refrigerant and a water cooling condenser using a liquid as the heat exchange medium.

The air cooling condenser, which is a component performing heat exchange with air introduced through an opening part of a front surface of the vehicle, is generally fixed to the front of the vehicle in which a bumper beam is formed for the purpose of smooth heat exchange with the air.

As illustrated in FIG. 1, a water cooling condenser 10 may use a plate type heat exchanger in which a plurality of plates 20 are stacked.

The water cooling condenser is configured to include a first flow part 21 and a second flow part 22 in which a first heat exchange medium and a second heat exchange medium flow, respectively, by stacking a plurality of plates 20, a first inlet pipe 31 and a first outlet pipe 32 into and from which the first heat exchange medium is introduced and discharged, a second inlet pipe 41 and a second outlet pipe 42 into and from which the second heat exchange medium is introduced and discharged, a gas-liquid separator 50 separating the first heat exchange medium into a gas-phase heat exchange medium and a liquid-phase heat exchange medium, a first connecting pipe 51 connecting a condensing region of the first flow part 21 and the gas-liquid separator 50 to each other, and a second connecting pipe 52 connecting the gas-liquid separator and an excessive cooling region of the first flow part 21 to each other.

In the water cooling condenser 10, the first heat exchange medium introduced through the first inlet pipe 31 flows to the condensing region of the first flow part 21, moves to the gas-liquid separator 50 through the first connecting pipe 51, again flows to the excessive cooling region of the first flow part 21 through the second connecting pipe 52, and is then discharged through the first outlet pipe 32.

In this case, the second heat exchange medium is introduced through the second inlet pipe 41, flows to the second flow part 22 formed alternately with the first flow part 21, and cools the first heat exchange medium.

Meanwhile, as the condenser configuring refrigeration cycle of the air conditioner for a vehicle, both of the air cooling condenser and the water cooling condenser may be used in order to improve heat exchange efficiency.

As illustrated in FIG. 2, in the case in which both of the water cooling condenser 11 and the air cooling condenser 12 are used, in the refrigeration cycle for a vehicle, a pipe layout becomes complicated in order to connect different types of heat exchangers to each other, and pipes should be additionally configured and assembled, and thus, an increase in a production cost is caused.

In addition, when the pipe layout becomes long and complicated, a refrigerant acts to be disadvantageous to a pressure drop while being moved, such that performance and efficiency of an air conditioner system for a vehicle cannot but be decreased.

As an attempt to improve this problem, Japanese Patent Laid-Open Publication No. 2008-180485 (published on Aug. 7, 2008 and entitled "Heat Exchanger") has disclosed a system in which a coolant cooled from a sub-radiator is transferred to a water cooling condenser and is heat-exchanged with a high-temperature and high-pressure refrigerant discharged from a compressor, and the refrigerant is transferred again to an air cooling condenser. In this system, the sub-radiator, the water cooling condenser, and the air cooling condenser are configured integrally with each other. However, there are problems that a tank of the sub-radiator and headers of the water cooling and air cooling condensers are different from each other, and an assembling property between the sub-radiator and the water cooling and air cooling condensers or weldability of a bonding part between the sub-radiator and the water cooling and air cooling condensers is low, and there is a limitation in improving all of the problems as described above.

Technical Problem

An object of the present invention is to provide an air conditioner system for a vehicle including an integral condenser in which a water cooling region and an air cooling region are formed integrally with each other, wherein the water cooling region and the air cooling region of the integral condenser are formed on one plate, such that existing air cooling and water cooling condensers may be formed integrally with each other through one-time brazing coupling, thereby reducing a package and simplifying assembling and manufacturing processes.

Technical Solution

In one general aspect, an air conditioner system for a vehicle includes: a compressor C compressing a refrigerant; an integral condenser 100 in which a water cooling region heat-exchanging the refrigerant compressed in and discharged from the compressor C with a coolant to condense the refrigerant and an air cooling region heat-exchanging the refrigerant with air to condense the refrigerant are formed integrally with each other; an expansion valve T expanding the refrigerant condensed in and discharged from the integral condenser 100; and an evaporator E evaporating the refrigerant expanded in and discharged from the expansion valve T, wherein the compressor C, the integral condenser 100, the expansion valve T, and the evaporator E are connected to each other by refrigerant pipes P.

The integral condenser 100 may be formed in a plate type, and include the water cooling region and the air cooling region formed on one plate.

The integral condenser 100 may include: a first refrigerant inlet 211 formed in a region in which the refrigerant channel part 110 for a water cooling condenser is formed and having a refrigerant introduced therethrough and a first refrigerant outlet 212 formed in the region in which the refrigerant channel part 110 for a water cooling condenser is formed and discharging the refrigerant; a second refrigerant inlet 221 formed in a region in which the refrigerant channel part 120 for an air cooling condenser is formed and having the refrigerant introduced therethrough and a second refrigerant outlet 222 formed in the region in which the refrigerant channel part 120 for an air cooling condenser is formed and discharging the refrigerant; and a coolant inlet 311 formed in the coolant plate 300 and having the coolant introduced therethrough and a coolant outlet 312 formed in the coolant plate 300 and discharging the coolant.

The coolant plate 300 may be formed by stacking a second upper plate 301 and a second lower plate 302 formed as a pair.

The refrigerant plate 200 and the coolant plate 300 may include: first communication holes 231 and second communication holes 232 that are in communication with the first refrigerant inlet 211 and the first refrigerant outlet 212 in a stack direction to be hollowed so that the refrigerant flows to the refrigerant channel part 110 for a water cooling condenser, the first communication holes 231 and the second communication holes 232 including first bonding parts 251 formed along circumferences thereof and protruding outwardly of the refrigerant plate 200; and third communication holes 233 and fourth communication holes 234 that are in communication with the coolant inlet 311 and the coolant outlet 312 in the stack direction to be hollowed so that the coolant flows to the coolant plate 300, the third communication holes 233 and the fourth communication holes 234 including second bonding parts 252 formed along circumferences thereof and protruding outwardly of the coolant plate 300.

The refrigerant plate 200 may further include: fifth to eighth communication holes 235 to 238 that are in communication with the second refrigerant inlet 221 and the second refrigerant outlet 222 in the stack direction to be hollowed so that the refrigerant flows to the refrigerant channel part 120 for an air cooling condenser, the fifth to eighth communication holes 235 to 238 including third bonding parts 253 formed along circumferences thereof and protruding outwardly of the refrigerant plate 200.

The refrigerant plate 200 may further include a ninth communication hole 239 hollowed at one side end portion or the other side end portion of a side at which the refrigerant channel part 120 for an air cooling condenser is formed so that the refrigerant flows, the ninth communication hole 239 including a fourth bonding part 254 formed along a circumference thereof and protruding outwardly of the refrigerant plate 200.

In the refrigerant plate 200, a division part 255 protruding inwardly of the refrigerant plate 200 to divide a predetermined region of an internal space into a first flow part 260 corresponding to a condensing region, and a second flow part 270 corresponding to an excessive cooling region in a width direction may be extended in the length direction in a region in which the fifth to eighth communication holes 235 to 238 are not formed in a region in which the refrigerant channel part 120 for an air cooling condenser is formed, the fifth communication hole 235 and the sixth communication hole 236 may be disposed at the first flow part 260 side at both side end portions of the division part 255, and the seventh communication hole 237 and the eighth communication hole 238 may be disposed at the second flow part 270 side at both side end portions of the division part 255.

In the integral condenser 100, the second flow part 270 may be disposed at a front side in an air blowing direction, and the first flow part 260 may be disposed at a rear side in the air blowing direction, and the refrigerant passing through the refrigerant channel part 110 for a water cooling condenser may be introduced into the first flow part 260 through the second refrigerant inlet 221 and be circulated through the first flow part 260, pass through a gas-liquid separator 140 formed by allowing the ninth communication holes 239 of a plurality of stacked refrigerant plates 200 to be in communication with each other by the fourth bonding parts 254, be circulated through the second flow part 270, and be then discharged to the second refrigerant outlet 222.

The integral condenser 100 may further include: a first connection part 510 forming a channel so that the first refrigerant outlet 212 and the second refrigerant inlet 221 are connected to each other; a second connection part 520 forming a channel so that the fifth communication hole 235 or the sixth communication hole 236 of the first flow part 260 and the ninth communication hole 239 are connected to each other in the refrigerant plate 200 positioned at the uppermost end; and a third connection part 530 forming a channel so that the seventh communication hole 237 or the eighth communication hole 238 of the second flow part 270 and the ninth communication hole 239 are connected to each other in the refrigerant plate 200 positioned at the lowermost end, and the first to third connection parts 510, 520, and 530 may be formed in an external pipe shape.

The integral condenser 100 may further include: a first connection part 510 forming a channel so that the first refrigerant outlet 212 and the second refrigerant inlet 221 are connected to each other; a second connection part 520 forming a channel so that the fifth communication hole 235 or the sixth communication hole 236 of the first flow part 260 and the ninth communication hole 239 are connected to each other in the refrigerant plate 200 positioned in a predetermined upper region; and a third connection part 530 forming a channel so that the seventh communication hole 237 or the eighth communication hole 238 of the second flow part 270 and the ninth communication hole 239 are connected to each other in the refrigerant plate 200 positioned in a predetermined lower region, and the first to third connection parts 510, 520, and 530 may be formed in the refrigerant plate 200.

The integral condenser 100 may be formed so that the seventh communication hole 237 formed at one side adjacent to the refrigerant channel part 110 for a water cooling condenser and the sixth communication hole 236 formed at the other side among the fifth to eighth communication holes 235 to 238 are opened, and the fifth communication hole 235 and the eighth communication holes 238 among the fifth to eighth communication holes 235 to 238 are closed, and include a sixth communication channel part 246 and a seventh communication channel part 247 formed by allowing the sixth communication holes 236 and the seventh communication holes 237 of a plurality of stacked refrigerant plates 200 to be in communication with each other, respectively, by the third bonding parts 253 in the region in which the refrigerant channel part 120 for an air cooling condenser is formed, partition parts may be formed in predetermined regions of the sixth communication channel part 246 and the seventh communication channel part 247, such that a first flow part 260 corresponding to a condensing region and a second flow part 270 corresponding to an excessive cooling region, are separated from each other in a height direction, and the first flow part 260 may be disposed above the second flow part 270.

The integral condenser 100 may include a gas-liquid separator further formed on one plate.

The integral condenser 100 may include: refrigerant plates 200 formed by stacking first upper plates 201 and first lower plates formed as pairs, a region thereof being separated in a length direction, such that refrigerant channel parts 110 for a water cooling condenser configuring the water cooling region and refrigerant channel parts 120 for an air cooling condenser configuring the air cooling region are formed; coolant plates 300 stacked alternately with the refrigerant plates 200 configuring the refrigerant channel parts 110 for a water cooling condenser to configure the water cooling region, and having the coolant flowing therein; and heat radiation fins 400 interposed in spaces between the refrigerant plates 200 configuring the refrigerant channel parts 120 for an air cooling condenser, and performing heat-exchange with air, and the refrigerant passing through all of the refrigerant channel parts 110 for a water cooling condenser may be introduced into the refrigerant channel parts 120 for an air cooling condenser.

The gas-liquid separator may be formed at one side end portion of the refrigerant channel parts for an air cooling condenser corresponding to a space between the refrigerant channel part for a water cooling condenser and the refrigerant channel parts for an air cooling condenser, or be formed at the other side end portion of the refrigerant channel parts for an air cooling condenser.

In the integral condenser 100, the gas-liquid separator may be formed at one side end portion of the refrigerant channel parts for an air cooling condenser corresponding to the space between the refrigerant channel part for a water cooling condenser and the refrigerant channel parts for an air cooling condenser, such that the refrigerant passing through the refrigerant channel part for a water cooling condenser is separated into a gas-phase refrigerant and a liquid-phase refrigerant in the gas-liquid separator and the refrigerant discharged from the gas-liquid separator passes through the refrigerant channel part for an air cooling condenser and is then discharged to the outside.

In the integral condenser 100, the gas-liquid separator may be formed at the other side end portion of the refrigerant channel part for an air cooling condenser, such that the refrigerant passing through the refrigerant channel part for a water cooling condenser passes through a condensing region of the refrigerant channel part for an air cooling condenser and is then introduced into the gas-liquid separator and the refrigerant discharged from the gas-liquid separator passes through an excessive cooling region of the refrigerant channel part for an air cooling condenser and is then discharged to the outside.

In the integral condenser 100, the gas-liquid separator may be formed at the other side end portion of the refrigerant channel part for an air cooling condenser, such that the refrigerant passing through the refrigerant channel part for a water cooling condenser passes through the refrigerant channel part for an air cooling condenser and is then introduced into the gas-liquid separator and the refrigerant discharged from the gas-liquid separator is discharged to the outside.

The air conditioner system for a vehicle may further include an auxiliary heat exchanger I connected between the integral condenser 100 and the expansion valve and heat-exchanging the refrigerant discharged from the integral condenser 100 and the refrigerant discharged from the evaporator with each other.

The auxiliary heat exchanger I may be additionally stacked and formed on the uppermost end or the lowermost end of the refrigerant plate 200 in which the refrigerant channel part 110 for a water cooling condenser is formed.

Advantageous Effects

The air conditioner system for a vehicle according to the present invention includes the integral condenser in which the water cooling region and the air cooling region are formed integrally with each other, such that a pipe configuration is simple and pipes do not need to be additionally configured and assembled, as compared with the related art in which the air cooling condenser and the water cooling condenser are separately formed and are connected to each other, thereby making it possible to reduce a production cost.

Particularly, in the air conditioner system for a vehicle according to the present invention, the water cooling region and the air cooling region of the integral condenser are formed on one plate, such that an integral module of existing air cooling and water cooling condensers may be manufactured through one-time brazing coupling, thereby making it possible to reduce a package and simplify assembling and manufacturing processes.

In more detail, the integral condenser is configured to include one refrigerant plate in which the refrigerant channel part for a water cooling condenser and the refrigerant channel part for an air cooling condenser are formed, the coolant plate disposed in a space between the refrigerant plates forming the refrigerant channel parts for a water cooling condenser, and the heat radiation fin interposed in a space between the refrigerant plates forming the refrigerant channel part for an air cooling condenser, and allows the refrigerant passing through all of the refrigerant channel parts for a water cooling condenser to be introduced into the refrigerant channel part for an air cooling condenser, whereby the air cooling condenser and the water cooling condenser may be formed integrally with each other through one-time brazing coupling.

In addition, in the present invention, the auxiliary heat exchanger that may be used as an internal heat exchanger IHX for a refrigerant of the vehicle is stacked and formed on a lower end or an upper end of the refrigerant plates forming the refrigerant channel part for a water cooling condenser or is formed by inserting a pipe into the communication channel part moving the refrigerant in the height direction in the refrigerant channel part for an air cooling condenser in a dual-pipe form, such that three heat exchangers may be formed integrally with each other through one-time brazing, thereby making it possible to simplify pipe connection and significantly reduce a package size, as compared with the related art in which the three heat exchangers are separately formed.

In addition, in the present invention, channels of the refrigerant flowing between regions serving as the air cooling condenser, the water cooling condenser, and the auxiliary heat exchanger may be formed through separate pipe connection, but may also be formed through internal channels of the plates, such that a pressure drop when the refrigerant flows is reduced and an unnecessary pressure drop is reduced, thereby making it possible to improve heat exchange efficiency.

Further, in the present invention, a plurality of hollowed communication holes are stacked on the refrigerant plate in a region in which the air cooling condenser is formed and are connected to each other, such that a space in which the refrigerant primarily passing through the refrigerant channel part for an air cooling condenser flows to allow gas-liquid separation to be made may be formed, thereby making it possible to form the gas-liquid separator that was separately formed in the related art integrally with the refrigerant plate.

Further, in the present invention, the refrigerant channel part for an air cooling condenser is positioned on the front surface in the air flow direction to allow air passing through the refrigerant channel part for an air cooling condenser to be used to cool the refrigerant channel part for a water cooling condenser, thereby making it possible to additionally improve cooling performance.

DESCRIPTION OF DRAWINGS

FIG. 31 is a schematic view illustrating an exemplary embodiment in which an auxiliary heat exchanger is configured in an integral condenser according to the present invention.

BEST MODE

Figure 1:
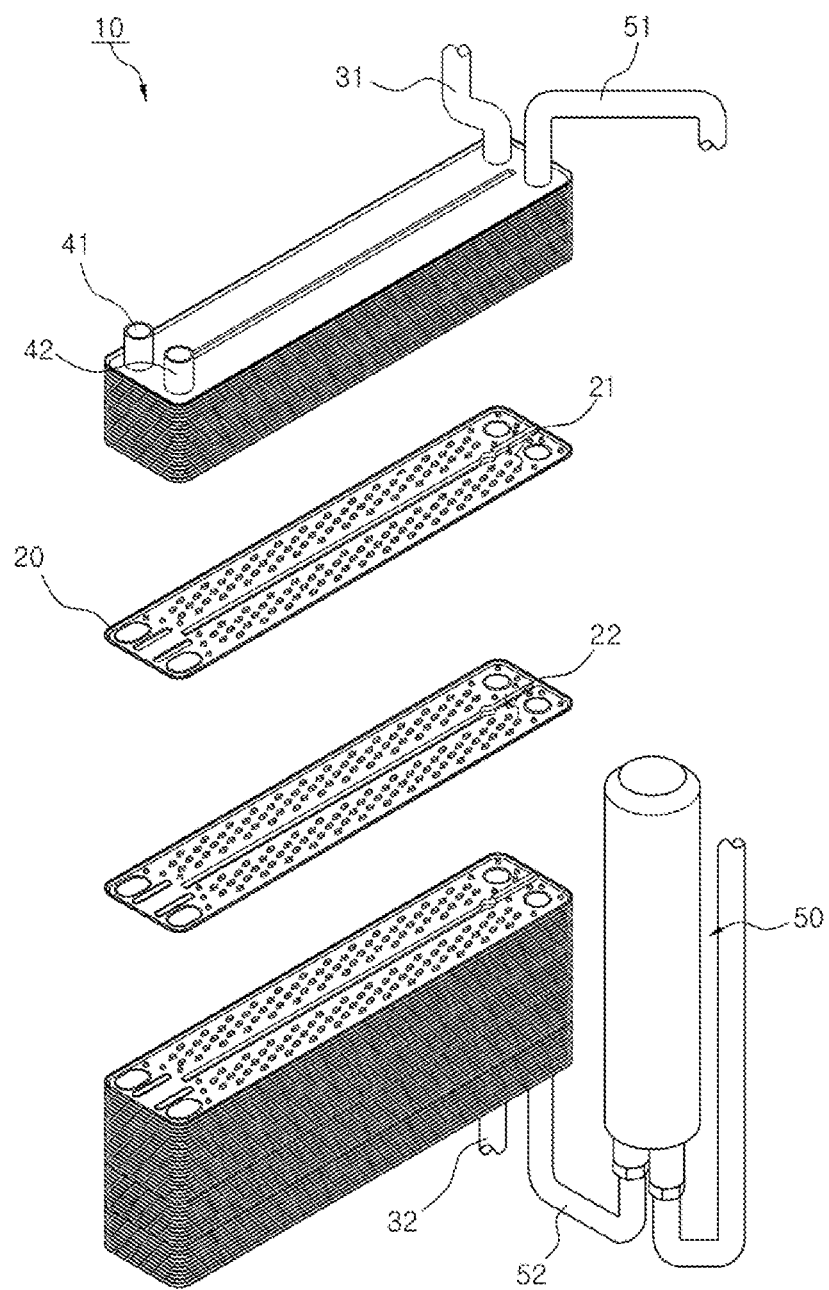
FIG. 1 is an exploded perspective view illustrating a water cooling condenser according to the related art.
Figure 2:
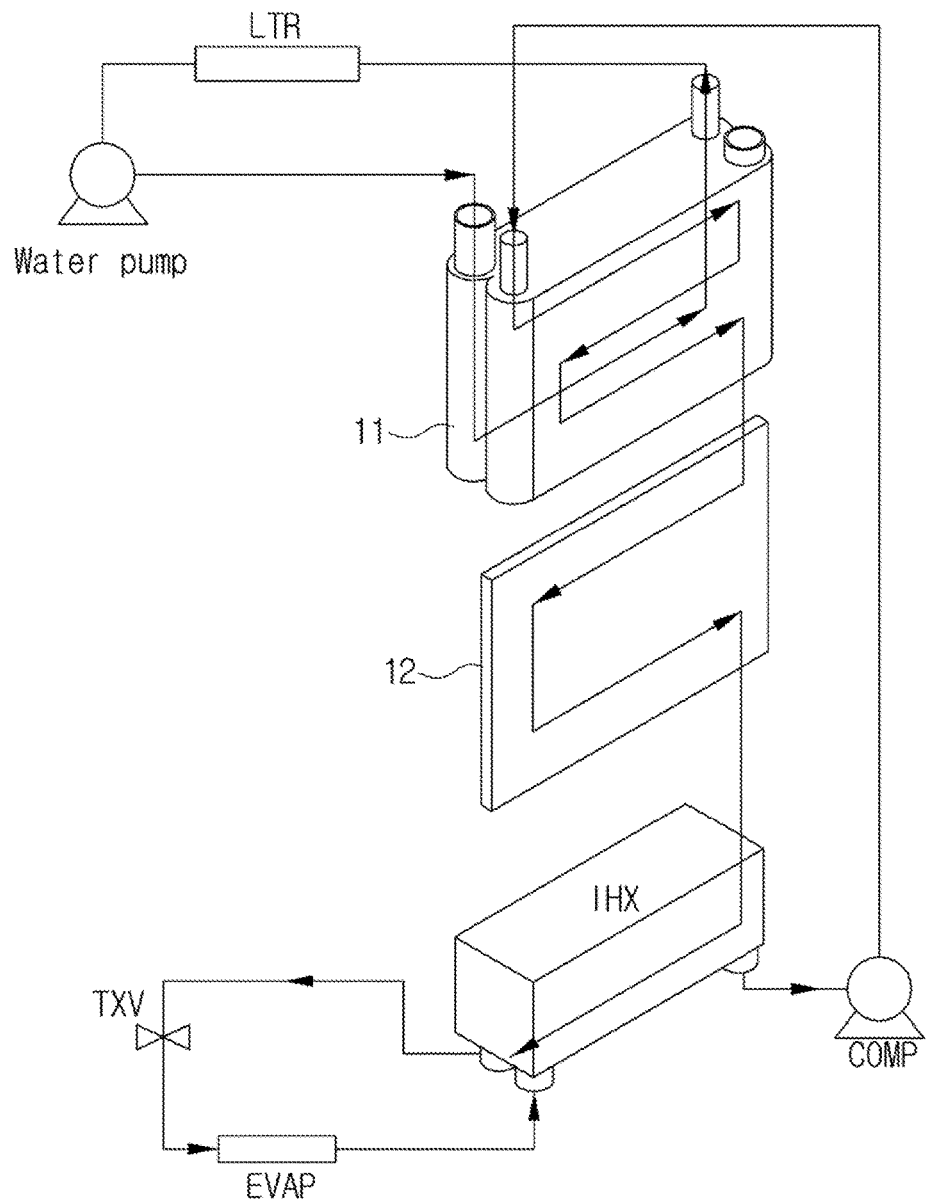
FIG. 2 is a view illustrating a configuration of an air conditioner system for a vehicle including all of an air cooling condenser, a water cooling condenser, and an internal heat exchanger (IHX).
Figure 3:
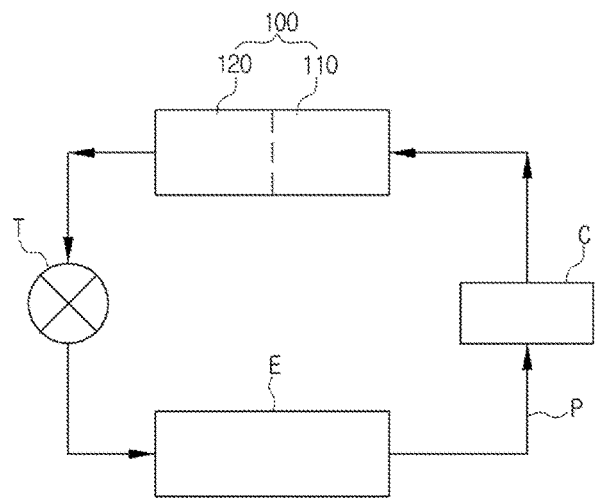
FIG. 3 is a view illustrating a configuration of an air conditioner system for a vehicle according to an exemplary embodiment of the present invention.
Figure 4:
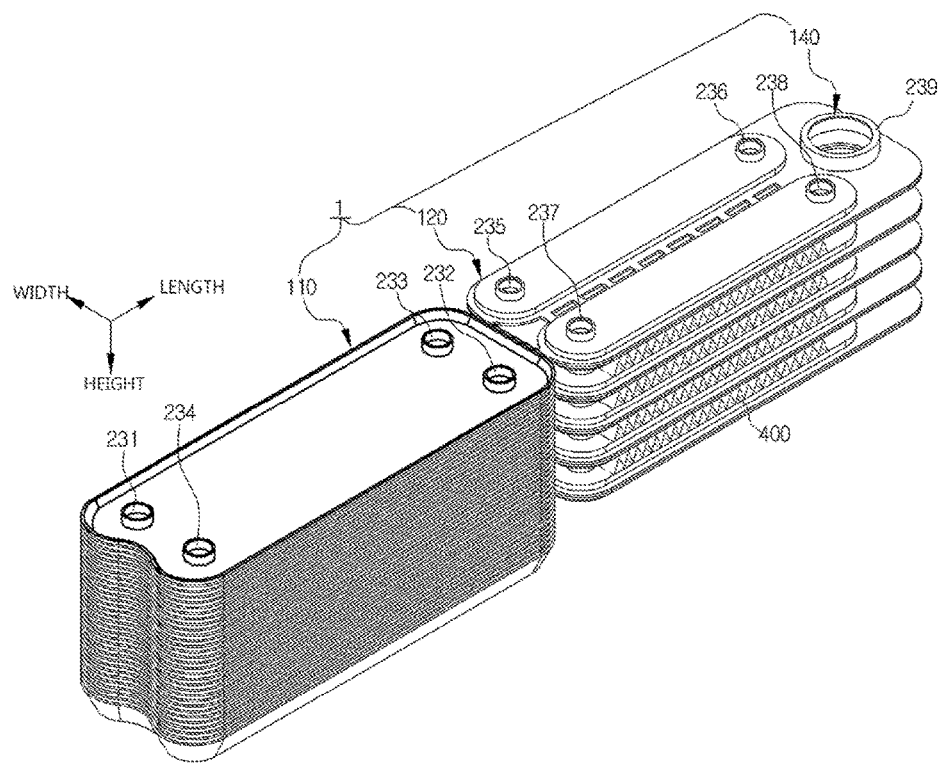
FIGS. 4 and 5 are, respectively, a perspective view and an exploded perspective view of an integral condenser according to an exemplary embodiment of the present invention.
Figure 5:
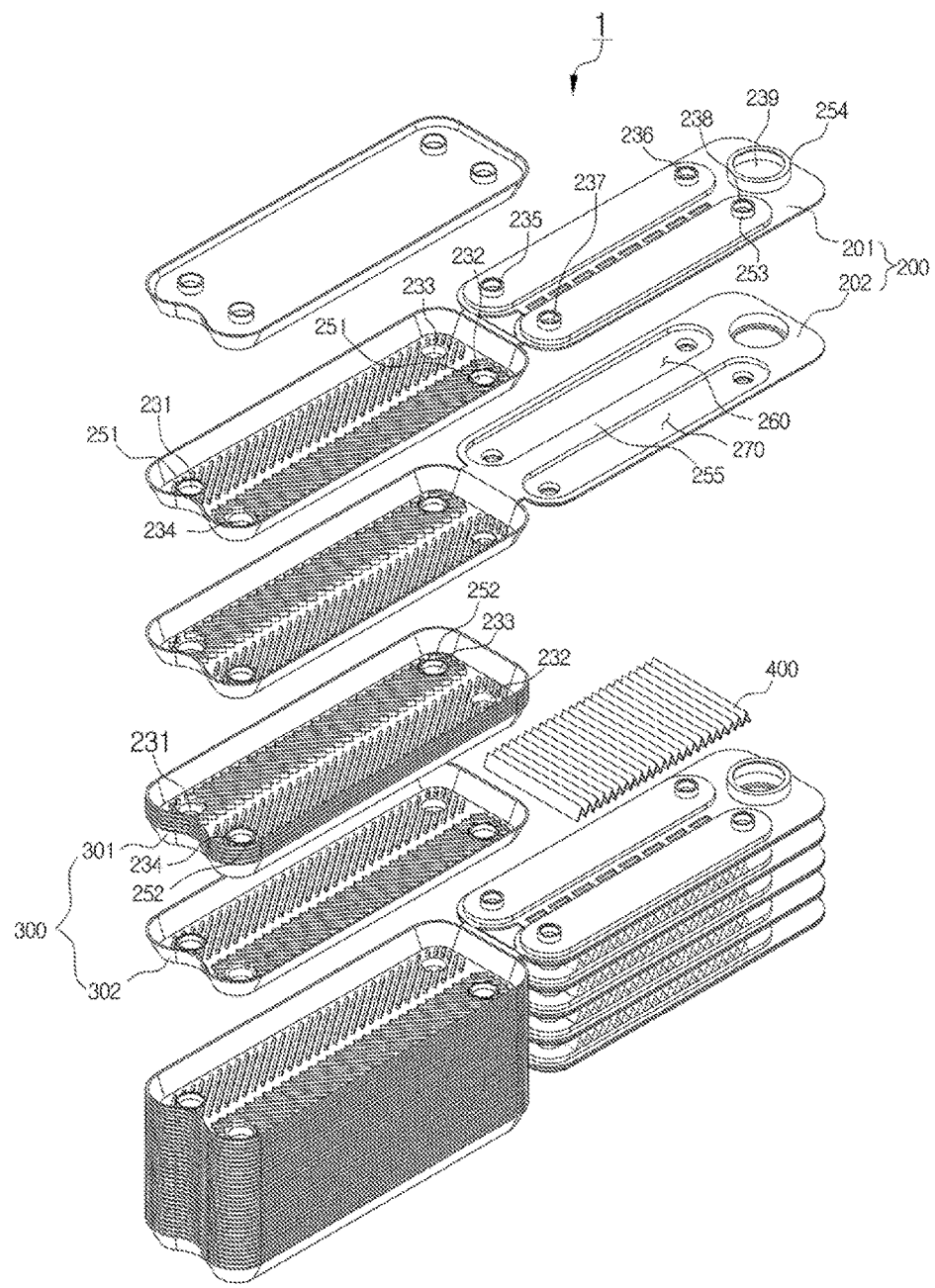
Figure 6:
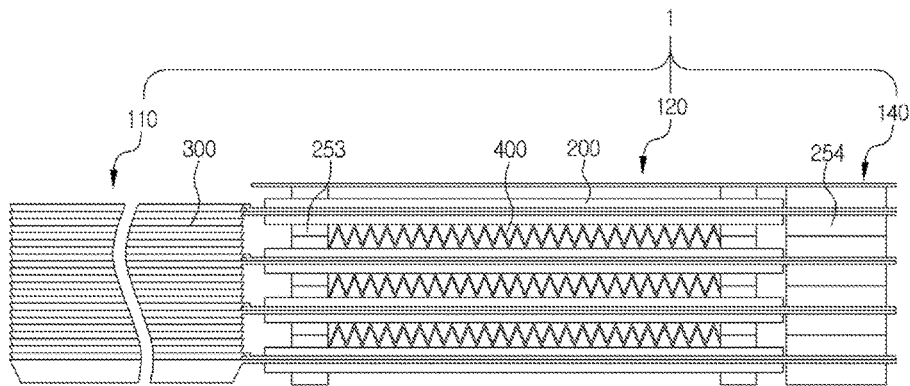
FIG. 6 is a side view illustrating a partial region of an integral condenser according to an exemplary embodiment of the present invention.

Hereinafter, an air conditioner system for a vehicle according to the present invention will be described in detail with reference to the accompanying drawings.

As illustrated, the air conditioner system for a vehicle according to the present invention is configured to include a compressor C compressing a refrigerant, an integral condenser 100 in which a water cooling region heat-exchanging the refrigerant compressed in and discharged from the compressor C with a coolant to condense the refrigerant and an air cooling region heat-exchanging the refrigerant with air to condense the refrigerant are formed integrally with each other, an expansion valve T expanding the refrigerant condensed in and discharged from the integral condenser, and an evaporator E evaporating the refrigerant expanded in and discharged from the expansion valve T, wherein the compressor C, the integral condenser 100, the expansion valve T, and the evaporator E are connected to each other by refrigerant pipes P.

First, the compressor C absorbs and compresses a low-temperature and low-pressure gas-phase refrigerant discharged from the evaporator E to discharge a high-temperature and high-pressure gas-phase refrigerant, while being driven by receiving power from a power supply source (an engine, a motor, or the like).

In the water cooling region of the integral condenser, the high-temperature and high-pressure gas-phase refrigerant discharged from the compressor 100 and flowing is heat-exchanged with the coolant to thereby be condensed and discharged as a liquid-phase refrigerant.

The water cooling region of the integral condenser is configured so that the refrigerant discharged from the compressor 100 and the coolant circulated through a low-temperature radiator installed in an engine room of the vehicle may be heat-exchanged with each other, such that the refrigerant and the coolant are heat-exchanged with each other.

In the air cooling region of the integral condenser, the refrigerant passing through the water cooling region and external air are heat-exchanged with each other, such that the refrigerant is additionally condensed.

The expansion valve rapidly expands the liquid-phase refrigerant discharged from the integral condenser by a throttle action and transfers the refrigerant in a low-temperature and low-pressure wet saturated state to the evaporator.

The evaporator E heat-exchanges a low-pressure liquid-phase refrigerant throttled in the expansion valve T with air blown toward the interior of the vehicle within an air conditioning case to evaporate the low-pressure liquid-phase refrigerant, thereby cooling air discharged to the interior through a heat absorbing action by latent heat of vaporization of the refrigerant.

Next, the low-temperature and low-pressure gas-phase refrigerant evaporated in and discharged from the evaporator E is again sucked in the compressor C, and is re-circulated through the refrigeration cycle as described above.

In addition, in a process of circulating the refrigerant as described above, the interior of the vehicle is cooled by introducing air blown by a blower (not illustrated) into the air conditioning case, cooling the air by latent heat of vaporization of a liquid-phase refrigerant circulated through an inner portion of the evaporator E while passing the air through the evaporator E, and discharging the air in a cooled state to the interior of the vehicle.

In an air conditioner system for a vehicle according to the related art, in an idle state or when a temperature of external air rises, a temperature of a coolant circulated through a low-temperature radiator (LTR) rises, the coolant of which the temperature rises is supplied to a water cooling condenser, thereby raising a temperature of a refrigerant flowing in the water cooling condenser.

In an air conditioner system 1 for a vehicle according to the present invention, since the integral condenser 100 is configured to include the water cooling region and the air cooling region, even though a temperature of the refrigerant flowing in the water cooling region rises, the refrigerant is additionally cooled in the air cooling region, such that the refrigerant may be introduced into an auxiliary heat exchanger I, which is an internal heat exchanger (IHX), in a state in which a temperature thereof is further lowered, thereby improving cooling performance. As a result, a temperature of a refrigerant introduced into the compressor C is lowered to prevent a rise in a temperature of a discharged refrigerant of the compressor C, thereby making it possible to improve durability and stability of the air conditioner system.

Hereinafter, an integral condenser included in an air conditioner system for a vehicle according to the present invention will be described in detail with reference to FIGS. 4 to 20.

The integral condenser 100 is formed in a plate type, and is mainly characterized in that the water cooling region and the air cooling region are formed on one plate.

In detail, in the integral condenser 100, a plate forming a refrigerant channel part 110 for a water cooling condenser and a plate forming a refrigerant channel part 120 for an air cooling condenser are formed as one plate, and a plurality of plates are stacked, such that an integral module of the water cooling condenser and the air cooling condenser may be manufactured by one-time brazing coupling.

In addition, in the integral condenser 100, a gas-liquid separator separating a refrigerant into a gas-phase refrigerant and a liquid-phase refrigerant may be further formed on one plate.

This configuration will be described in more detail. The integral condenser 100 is configured to mainly include refrigerant plates 200, coolant plates 300, and heat radiation fins 400.

A plurality of refrigerant plates 200 including first upper plates 201 and first lower plates 202 formed as pairs may be stacked, and a region of an internal space formed by stacking the first upper plates 201 and the first lower plates 202 is separated in a length direction, such that the refrigerant channel parts 110 for a water cooling condenser and the refrigerant channel parts 120 for an air cooling condenser are formed.

The coolant plates 300 are stacked alternately with the refrigerant plates 200 configuring the refrigerant channel parts 110 for a water cooling condenser, and are formed so that a coolant flows therein.

The coolant plate 300 includes a second upper plate 301 and a second lower plate 302 formed as a pair, and the coolant may flow to an internal space of the coolant plate 300.

The heat radiation fins 400 are interposed in spaces between the refrigerant plates 200 configuring the refrigerant channel parts 120 for an air cooling condenser, and perform heat-exchange with air to increase a heat transfer area.

That is, the integral condenser 100 is formed by stacking the plurality of refrigerant plates 200, interposing and stacking the coolant plates 300 between the refrigerant plates 200 forming the refrigerant channel part 110 for a water cooling condenser, and interposing the heat radiation fins 400 between the refrigerant plates 200 forming the refrigerant channel part 120 for an air cooling condenser.

Particularly, in the integral condenser 100, a gas-phase refrigerant compressed at a high temperature and a high pressure from the compressor passes through all of the refrigerant channel parts 110 for a water cooling condenser to be primarily heat-exchanged with the coolant, and is then introduced into the refrigerant channel part 120 for an air cooling condenser to be secondarily heat-exchanged with external air.

Figure 18:
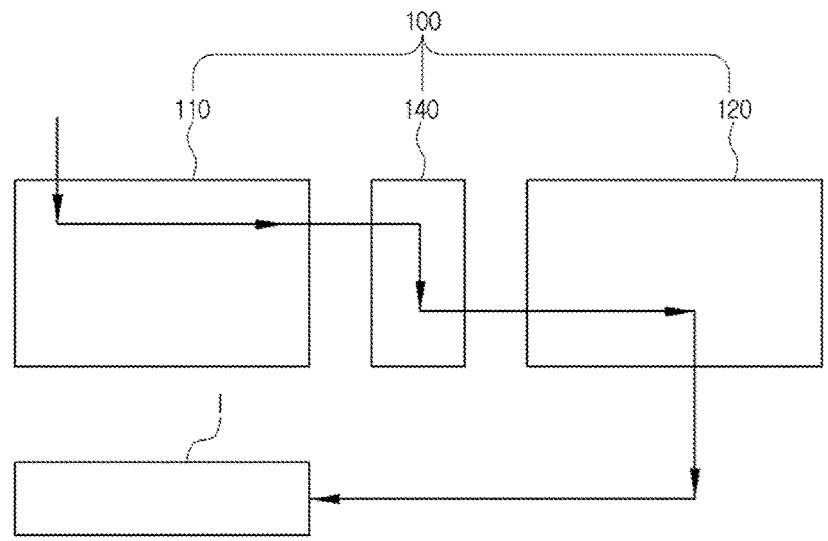
FIGS. 18 to 20 are schematic views illustrating various exemplary embodiments in which a gas-liquid separator is configured in an integral condenser according to the present invention and refrigerant flows.
Figure 20:
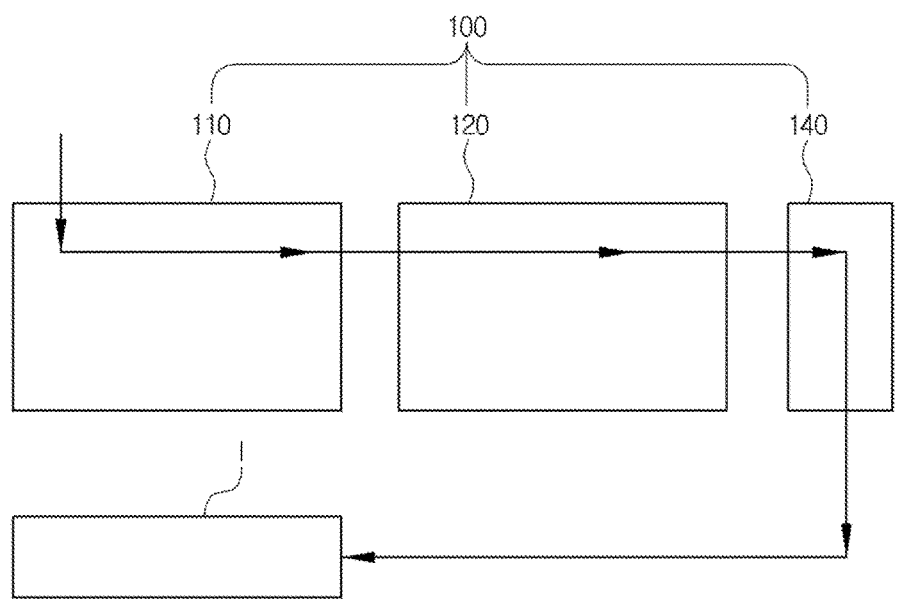
Figure 21:
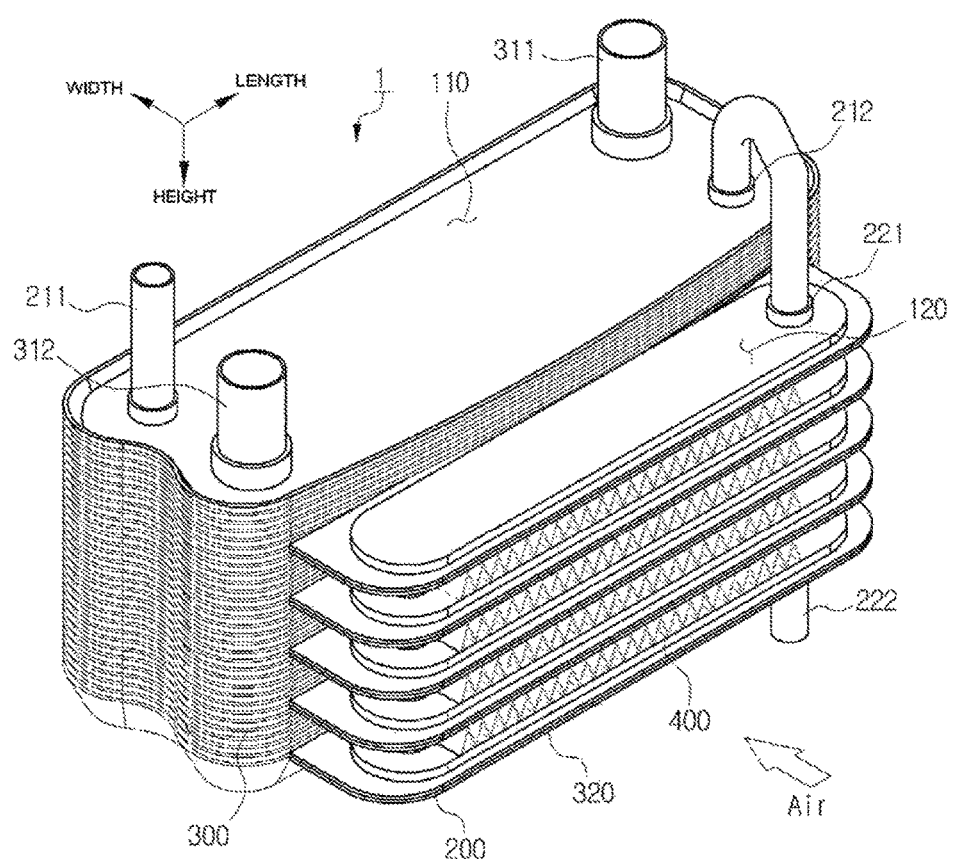
FIGS. 21 and 22 are, respectively, a perspective view and an exploded perspective view of an integral condenser according to an exemplary embodiment of the present invention.
Figure 22:
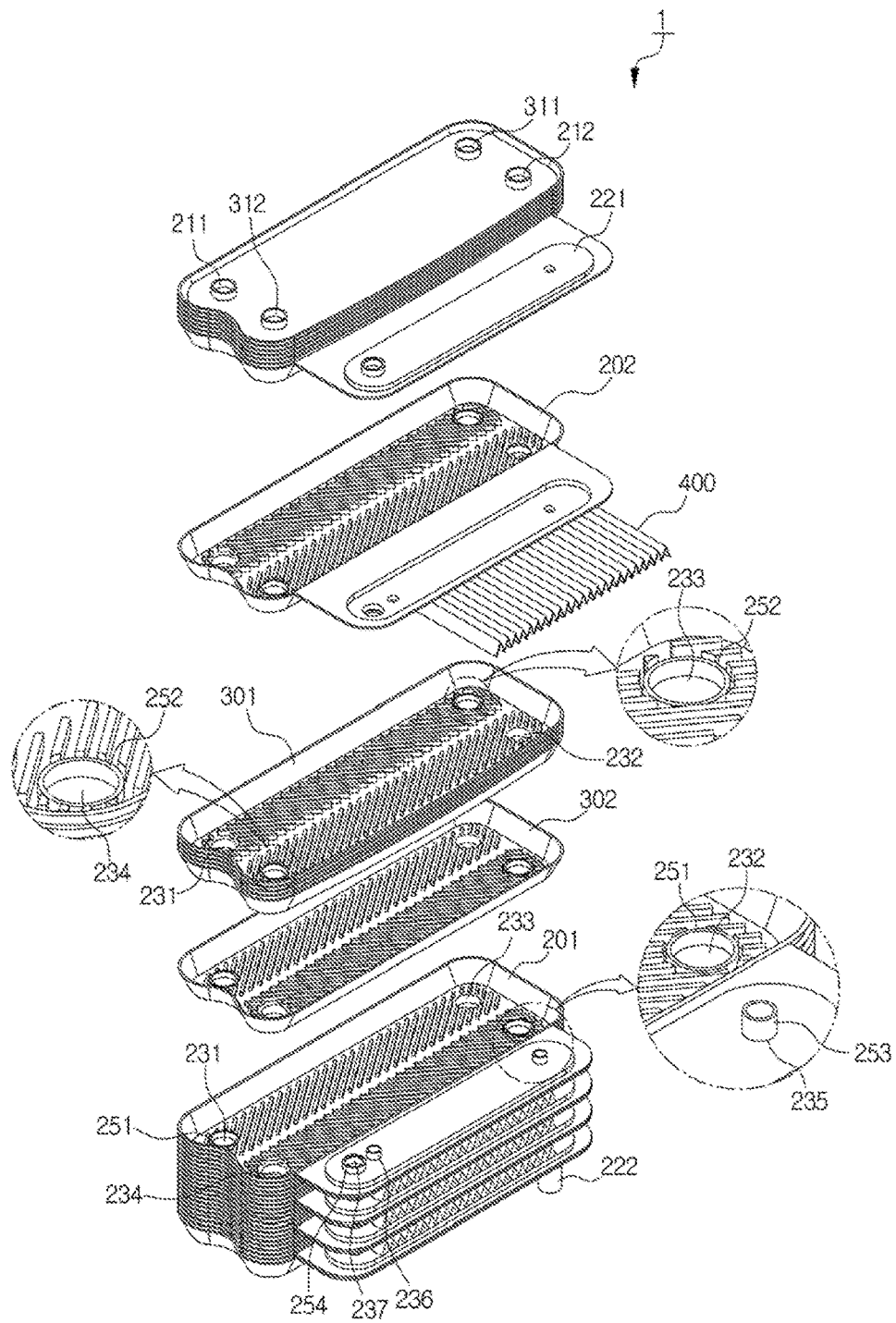

In this case, as illustrated in FIGS. 18 and 20, in the integral condenser 100, the gas-liquid separator 140 may be formed at one side end portion of the refrigerant channel part 120 for an air cooling condenser, which is a space between the refrigerant channel part 110 for a water cooling condenser and the refrigerant channel part 120 for an air cooling condenser, or may be formed at the other side end portion of the refrigerant channel part 120 for an air cooling condenser.

In the integral condenser 100 illustrated in FIG. 18, the gas-liquid separator 140 is formed at one side end portion of the refrigerant channel part 120 for an air cooling condenser, which is the space between the refrigerant channel part 110 for a water cooling condenser and the refrigerant channel part 120 for an air cooling condenser, such that the integral condenser 100 has a refrigerant flow path through which the refrigerant passing through the refrigerant channel part 110 for a water cooling condenser is separated into a gas-phase refrigerant and a liquid-phase refrigerant in the gas-liquid separator 140 and the refrigerant discharged from the gas-liquid separator 140 passes through the refrigerant channel part 120 for an air cooling condenser and is then discharged to the outside.

In this case, the refrigerant may flow through one path within the refrigerant channel part 110 for a water cooling condenser, which is the water cooling region, and the refrigerant channel part 120 for an air cooling condenser, which is the air cooling region, but may flow through two or more paths. This may be variously modified.

Figure 19:
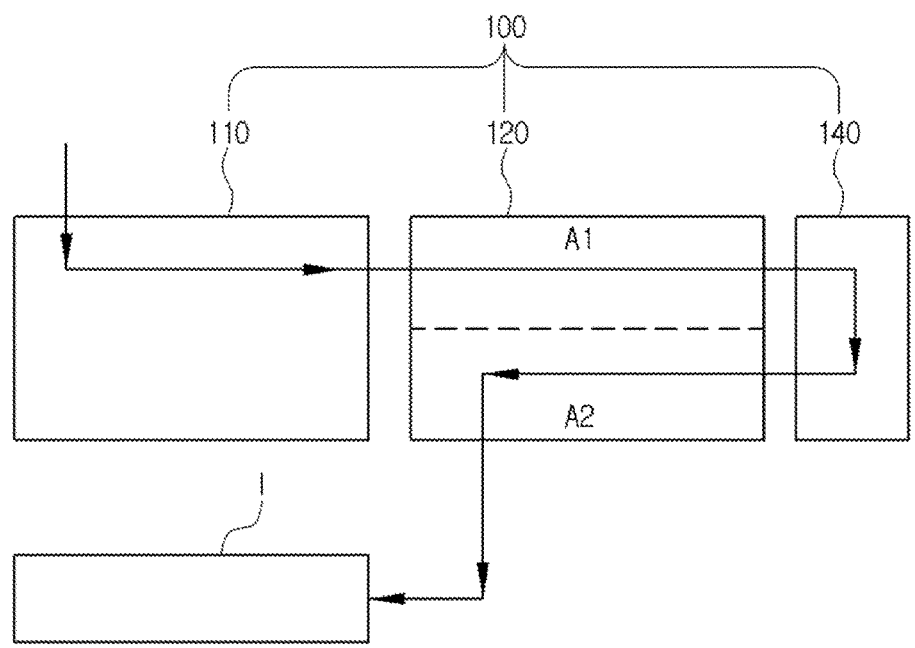

As another exemplary embodiment, in the integral condenser 100 illustrated in FIG. 19, the gas-liquid separator 140 is formed at the other side end portion of the refrigerant channel part 120 for an air cooling condenser, such that the integral condenser 100 has a refrigerant flow path through which the refrigerant passing through the refrigerant channel part 110 for a water cooling condenser passes through a condensing region A1 of the refrigerant channel part 120 for an air cooling condenser and is then introduced into the gas-liquid separator 140 and the refrigerant discharged from the gas-liquid separator 140 passes through an excessive cooling region A2 of the refrigerant channel part 120 for an air cooling condenser and is then discharged to the outside.

As still another exemplary embodiment, in the integral condenser 100 illustrated in FIG. 20, the gas-liquid separator 140 is formed at the other side end portion of the refrigerant channel part 120 for an air cooling condenser, such that the integral condenser 100 has a refrigerant flow path through which the refrigerant passing through the refrigerant channel part 110 for a water cooling condenser passes through the refrigerant channel part 120 for an air cooling condenser and is then introduced into the gas-liquid separator 140 and the refrigerant discharged from the gas-liquid separator 140 is discharged to the outside.

In the integral condenser 100 illustrated in FIGS. 18 and 19, the refrigerant passing through all of the water cooling region, the air cooling region, and the gas-liquid separator 140 to the outside may be introduced into an internal heat exchanger IHX, which is an auxiliary heat exchanger I to be described below.

Hereinafter, for convenience of explanation, a description will be provided on the basis of the integral condenser 100 illustrated in FIG. 19.

The integral condenser 100 having the characteristics as described above may be configured to include a first refrigerant inlet 211 formed in a region in which the refrigerant channel part 110 for a water cooling condenser is formed and having a refrigerant introduced therethrough and a first refrigerant outlet 212 formed in the region in which the refrigerant channel part 110 for a water cooling condenser is formed and discharging the refrigerant; a second refrigerant inlet 221 formed in a region in which the refrigerant channel part 120 for an air cooling condenser is formed and having the refrigerant introduced from the first refrigerant outlet 212 therethrough and a second refrigerant outlet 222 formed in the region in which the refrigerant channel part 120 for an air cooling condenser is formed and discharging the refrigerant; and a coolant inlet 311 formed in the coolant plate 300 and having the coolant introduced therethrough and a coolant outlet 312 formed in the coolant plate 300 and discharging the coolant.

In this case, the refrigerant plate 200 and the coolant plate 300 include first communication holes 231 and second communication holes 232 that are in communication with the first refrigerant inlet 211 and the first refrigerant outlet 212 in a stack direction to be hollowed so that the refrigerant flows to the refrigerant channel part 110 for a water cooling condenser, and the first communication holes 231 and the second communication holes 232 include first bonding parts 251 formed along circumferences thereof and protruding outwardly of the refrigerant plate 200.

In addition, the refrigerant plate 200 and the coolant plate 300 include third communication holes 233 and fourth communication holes 234 hollowed so that the coolant inlet 311 through which the refrigerant flows to the coolant plates 213 and the coolant outlet 312 are in communication with each other in the stack direction, and the third communication holes 233 and the fourth communication holes 234 include second bonding parts 252 formed along circumferences thereof and protruding outwardly of the coolant plate 300.

Referring to FIGS. 8 to 11, first, the refrigerant plate 200 may be formed by stacking the first upper plate and the first lower plate formed as a pair. In this case, the refrigerant may flow to an internal space formed by assembling one pair of first upper plate 201 and first lower plate 202, and a space to which the refrigerant flows is called an inner side and an external space is called an outer side.

The refrigerant plate 200 includes the first communication hole 231, the second communication hole 232, the third communication hole 233, and the fourth communication hole 234 hollowed and formed in a region in which the refrigerant channel part 110 for a water cooling condenser is formed, and the coolant plate 300 also includes the first communication hole 231, the second communication hole 232, the third communication hole 233, and the fourth communication hole 234 hollowed and formed in a region corresponding to the above-mentioned region.

In addition, the refrigerant plate 200 includes fifth to eighth communication holes 235 to 238 that are in communication with the second refrigerant inlet 221 and the second refrigerant outlet 222 in the stack direction to be hollowed so that the refrigerant flows to the refrigerant channel part 120 for an air cooling condenser, and the fifth to eighth communication holes 235 to 238 include third bonding parts 253 formed along circumferences thereof and protruding outwardly of the refrigerant plate 200.

An exemplary embodiment in which the first communication hole 231 is connected to the first refrigerant inlet 211 and the second communication hole 232 is connected to the first refrigerant outlet 212 has been illustrated in FIGS. 8 to 11, but the first communication hole 231 and the second communication hole 232 may be connected as opposed to the exemplary embodiment described above, and positions of the first communication hole 231 and the second communication hole 232 may also be modified.

In addition, an exemplary embodiment in which the third communication hole 233 is connected to the coolant inlet 311 and the fourth communication hole 234 is connected to the coolant outlet 312 has been illustrated in FIGS. 8 to 11, but may also be modified.

Hereinafter, a description will be provided on the basis of the exemplary embodiment illustrated in FIGS. 8 to 11 for convenience of explanation.

Figure 8:
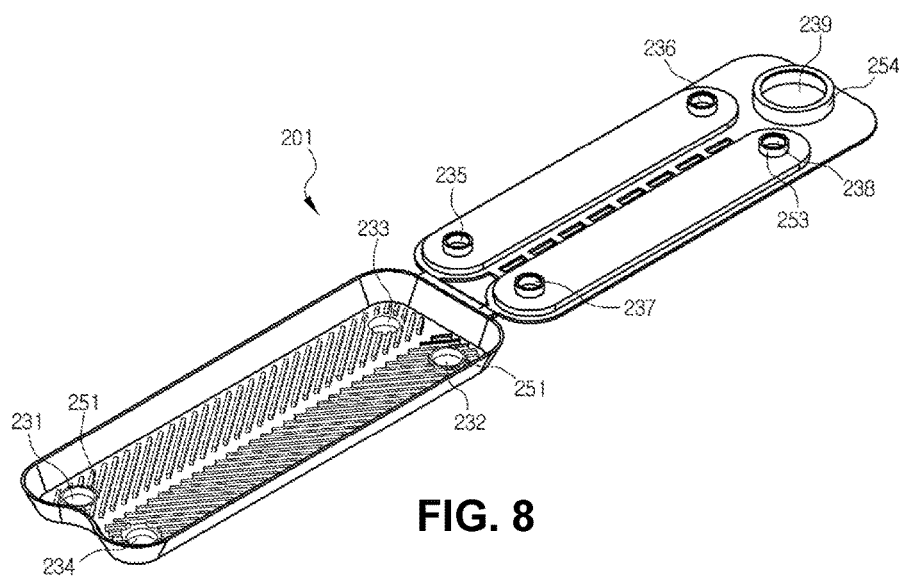
FIGS. 8 and 9 are perspective views illustrating a first upper plate and a first lower plate of the integral condenser illustrated in FIG. 7.
Figure 9:
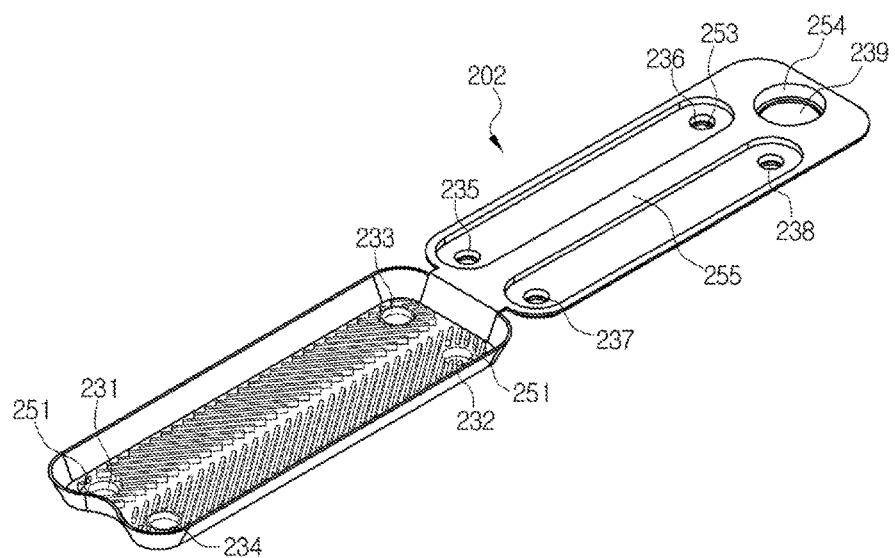

As illustrated in FIGS. 8 and 9, the refrigerant plate 200 formed by stacking one pair of first upper plate 201 and first lower plate 202 includes the first bonding parts 251 formed along circumferential surfaces of the first communication hole 231 and the second communication hole 232 and protruding outwardly of the refrigerant plate 200 and the second bonding parts 252 formed along circumferential surfaces of the third communication hole 233 and the fourth communication hole 234 and protruding inwardly of the refrigerant plate 200. Only the refrigerant flows into the refrigerant plate 200, and the coolant does not flow into the refrigerant plate 200, by the first bonding parts 251 and the second bonding parts 252.

As illustrated in FIGS. 8 and 9, the coolant plate 300 formed by stacking one pair of second upper plate 301 and second lower plate 302 includes the first bonding parts 251 formed along circumferential surfaces of the first communication hole 231 and the second communication hole 232 and protruding inwardly of the coolant plate 300 and the second bonding parts 252 formed along circumferential surfaces of the third communication hole 233 and the fourth communication hole 234 and protruding outwardly of the coolant plate 300. Only the coolant flows into the coolant plate 300, and the refrigerant does not flow into the coolant plate 300, by the first bonding parts 251 and the second bonding parts 252.

In addition, the refrigerant plate 200 includes the fifth communication hole 235, the sixth communication hole 236, the seventh communication hole 237, and the eighth communication hole 238 formed at a side at which the refrigerant channel part 120 for an air cooling condenser is formed, and includes a fifth communication channel part 245, a sixth communication channel part 246, a seventh communication channel part 247, and an eighth communication channel part 248 through which the refrigerant may flow to the fifth to eighth communication holes 235 to 238 of the refrigerant plate 200 stacked to neighbor to the refrigerant plate 200 in a height direction by the third bonding parts 253 protruding outwardly of the refrigerant plate 200 along circumferential surfaces of the fifth to eighth communication holes 235 to 238.

In this case, it is preferable that the third bonding part 253 protrudes by ½ of a height of the heat radiation fin 400, such that when the third bonding part 253 of the second upper plate 301 and the third bonding part 253 of the second lower plate 302 are in contact with and are coupled to each other, the heat radiation fin 400 is interposed in a space between the third bonding parts 253 in the length direction.

In this case, in the integral condenser 100 according to the present invention, the gas-liquid separator provided in an existing condenser and serving to separate the refrigerant into a gas-phase refrigerant and a liquid-phase refrigerant may be formed integrally with the refrigerant plate 200 through a ninth communication hole 239 formed on the refrigerant plate 200, as illustrated in FIGS. 18 to 20, or may be formed as a component separate from the refrigerant plate 200 and be connected to the refrigerant plate 200 through a connection member.

The integral condenser 100 having the refrigerant plate 200 illustrated in FIGS. 8 and 9 may include the ninth communication hole 239 hollowed in a region adjacent to one side end portion of a side at which the refrigerant channel part 120 for an air cooling condenser is formed, that is, a right side end portion in FIGS. 8 and 9 so that the refrigerant flows, and the ninth communication hole 239 includes a fourth bonding part 254 formed along a circumference thereof and protruding outwardly of the refrigerant plate 200.

That is, the fourth bonding part 254 protrudes upwardly from a circumferential surface of the ninth communication hole 239 formed in the first upper plate 201, and protrudes downwardly from a circumferential surface of the ninth communication hole 239 formed in the first lower plate 202.

The fourth bonding part 254 is formed at the same height as that of the third bonding part 253 to allow the ninth communication holes 239 of the plurality of refrigerant plates 200 stacked through assembling to be in communication with each other, thereby forming a pipe-type gas-liquid separator 140 to which the refrigerant may flow in the height direction.

Figure 7:
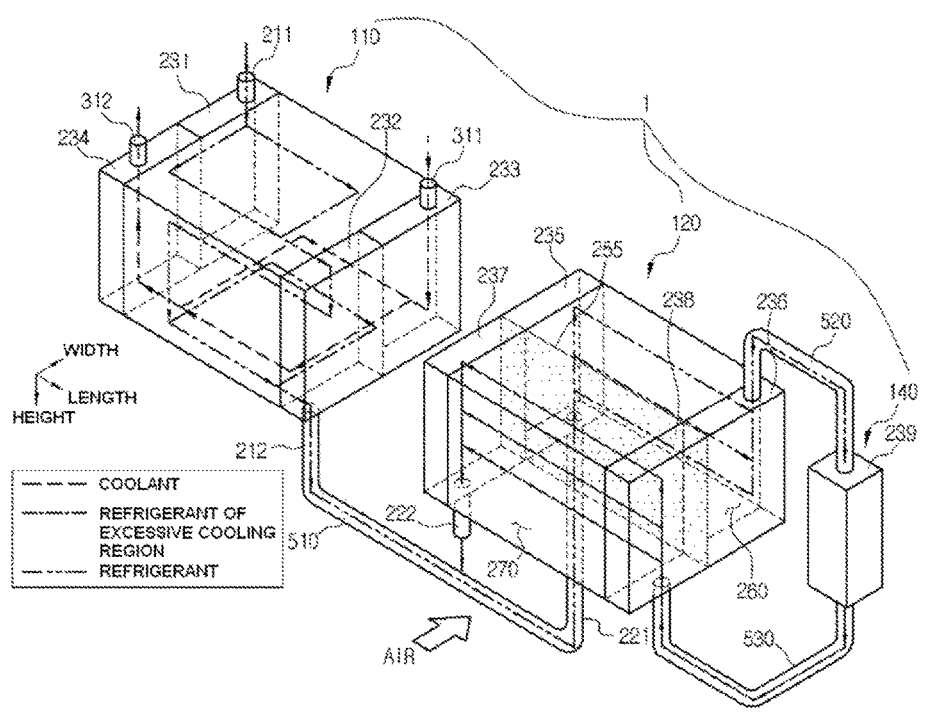
FIG. 7 is a schematic view illustrating refrigerant and coolant flow paths in an integral condenser according to an exemplary embodiment of the present invention.

Meanwhile, in the integral condenser 100 according to the present invention, a channel of the coolant or the refrigerant flowing in the integral condenser 100 may be variously modified. As illustrated in FIG. 7, the refrigerant channel part 120 for an air cooling condenser may be separated into a front region and a rear region in an air blowing direction, the front region in which low-temperature air is required may be utilized as an excessive cooling region A2, and the rear region may be utilized as a condensing region A1.

Figure 12:
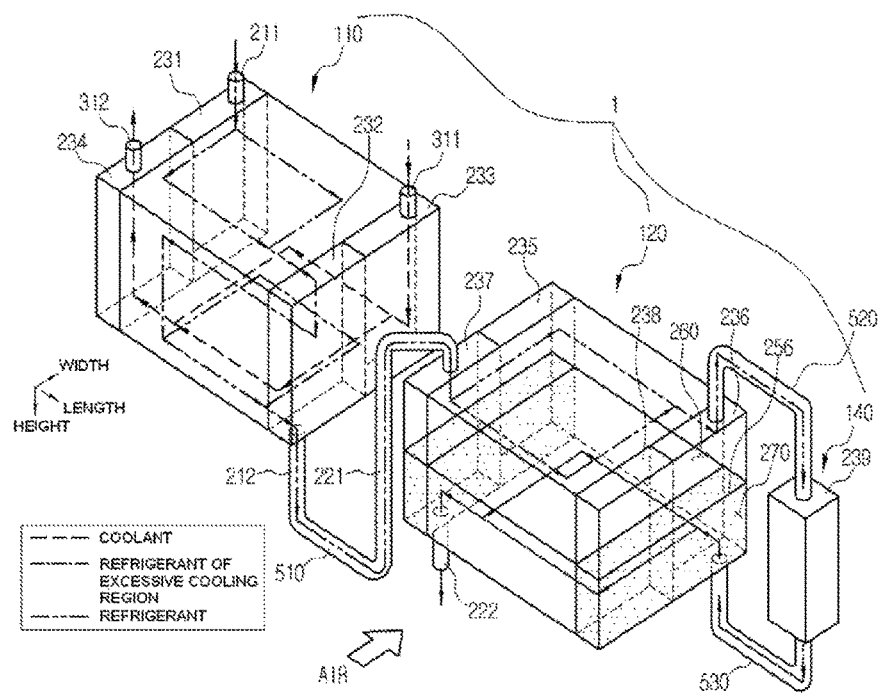
FIG. 12 is a schematic view illustrating refrigerant and coolant flow paths in an integral condenser according to another exemplary embodiment of the present invention.

In addition, as illustrated in FIG. 12, in the integral condenser 100 according to the present invention, the refrigerant channel part 120 for an air cooling condenser may be separated into an upper region and a lower region, the upper region may be used as a condensing region, and after the refrigerant passing through the upper region moves to the gas-liquid separator 140, a liquid-phase refrigerant is introduced from a lower end, thereby making it possible to allow the lower region to be used as an excessive cooling region A2.

First, the integral condenser 100 according to an exemplary embodiment illustrated in FIG. 7 is configured to include the refrigerant plates 200 and the coolant plates 300 illustrated in FIGS. 8 to 11.

That is, as illustrated in FIGS. 8 and 9, the refrigerant plate 200 may be formed so that a division part 255 protruding inwardly of the refrigerant plate 200 to divide a predetermined region of an internal space into a first flow part 260, which is the condensing region A1, and a second flow part 270, which is the excessive cooling region A2, in a width direction is extended in the length direction in a region in which the fifth to eighth communication holes 235 to 238 are not formed in a region in which the refrigerant channel part 120 for an air cooling condenser is formed, the fifth communication hole 235 and the sixth communication hole 236 are disposed at the first flow part 260 side at both side end portions of the division part 255, and the seventh communication hole 237 and the eighth communication hole 238 are disposed at the second flow part 270 side at both side end portions of the division part 255.

In this case, in the integral condenser 100 according to the present invention, the second flow part 270 is disposed at a front side in the air blowing direction, and the first flow part 260 is disposed at a rear side in the air blowing direction.

The integral condenser 100 according to the present invention may be configured to include a first connection part 510 formed between the refrigerant channel part 110 for a water cooling condenser and the refrigerant channel part 120 for an air cooling condenser and having the refrigerant movable therethrough, a second connection part 520 connecting the first flow part 260 and the gas-liquid separator 140 to each other, and a third connection part 530 connecting the gas-liquid separator 140 and the second flow part 270 to each other.

The first to third connection parts 510, 520, and 530 may be formed in an external pipe shape. In this case, the first connection part 510 may be formed so that the first refrigerant outlet 212 and the second refrigerant inlet 221 are connected to each other through an external pipe, the second connection part 520 may form a channel so that the fifth communication hole 235 or the sixth communication hole 236 of the first flow part 260 and the ninth communication hole 239 are connected to each other in the refrigerant plate 200 positioned at the uppermost end, and the third connection part 530 may form a channel so that the seventh communication hole 237 or the eighth communication hole 238 of the second flow part 270 and the ninth communication hole 239 are connected to each other in the refrigerant plate 200 positioned at the lowermost end.

As another exemplary embodiment, the first to third connection parts 510, 520, and 530 may be formed in the refrigerant plate 200. In this case, the first connection part 510 may form a channel by connecting the second communication hole 232 and the fifth communication hole 235 to each other so that the first refrigerant outlet 212 and the second refrigerant inlet 221 are connected to each other at the shortest distance, the second connection part 520 may form a channel so that the fifth communication hole 235 or the sixth communication hole 236 of the first flow part 260 and the ninth communication hole 239 are connected to each other in the refrigerant plate 200 positioned in a predetermined upper region, and the third connection part 530 may form a channel so that the seventh communication hole 237 or the eighth communication hole 238 of the first flow part 260 and the ninth communication hole 239 are connected to each other in the refrigerant plate 200 positioned in a predetermined lower region.

Here, the second connection part 520 is a path through which the refrigerant of which condensation is finished is introduced into the gas-liquid separator 140 and may be formed to be connected to an upper region of the gas-liquid separator 140, and the third connection part 530 is a path through which a liquid-state refrigerant gas-liquid-separated in the gas-liquid separator 140 and settled is introduced into the second flow part 270, which is the excessive cooling region A2, and may be formed to be connected to a lower region of the gas-liquid separator 140.

Figure 10:
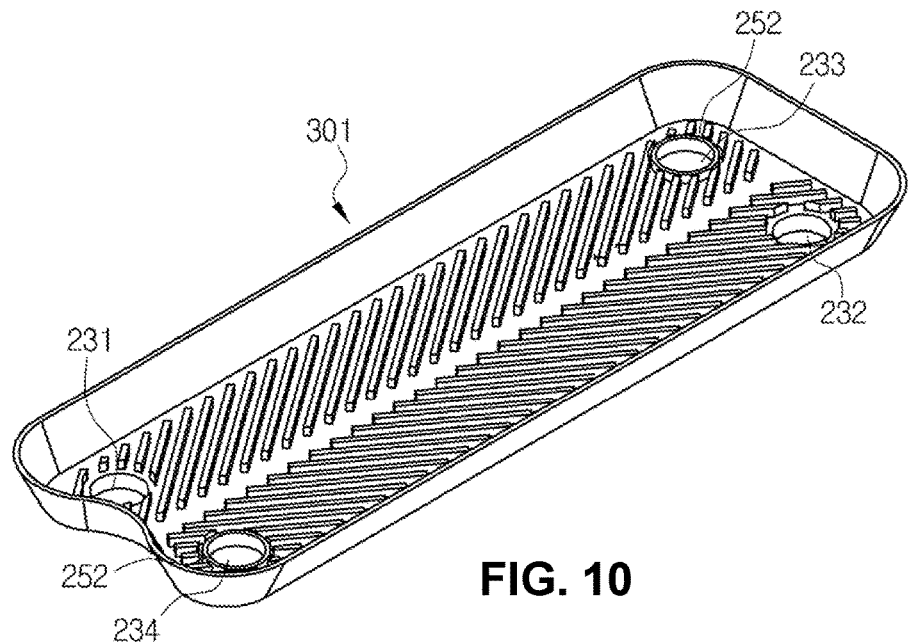
FIGS. 10 and 11 are perspective views illustrating a second upper plate and a second lower plate of an integral condenser according to an exemplary embodiment of the present invention.
Figure 11:
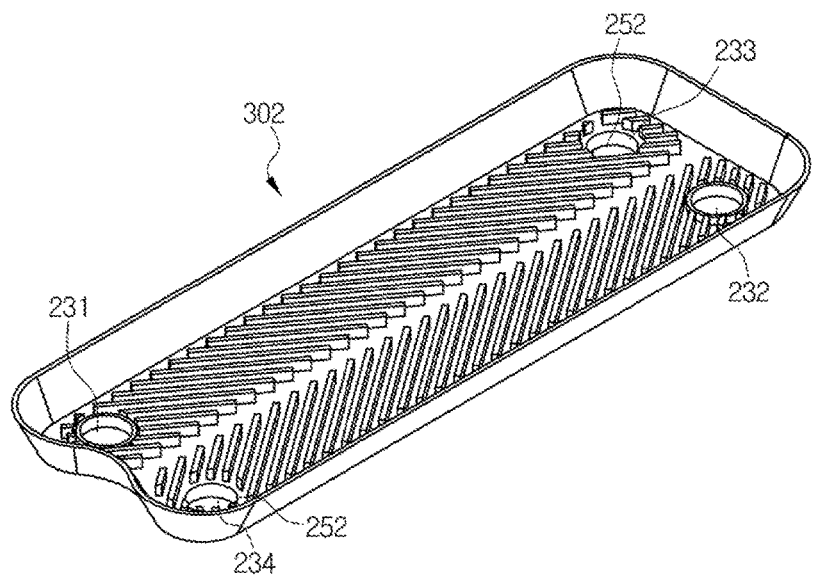
Figure 13:
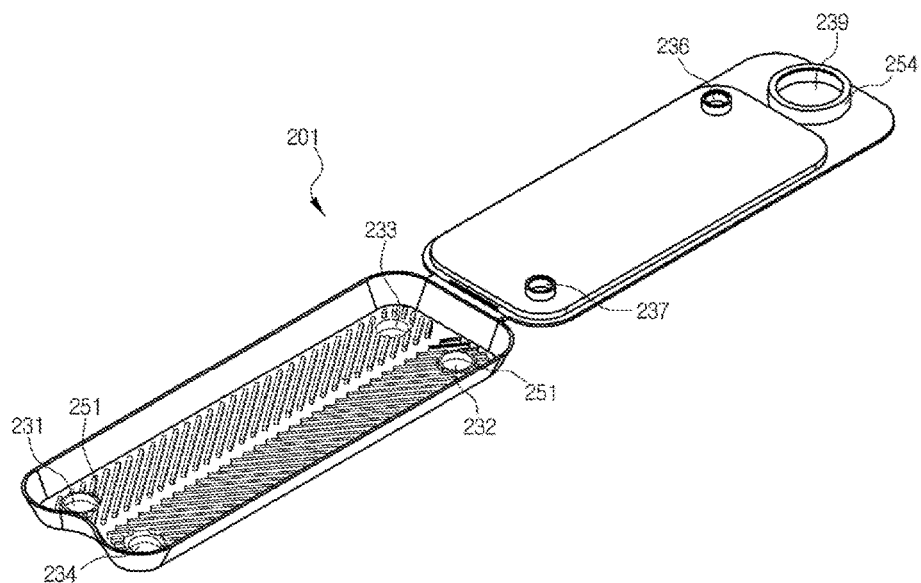
FIGS. 13 and 14 are perspective views illustrating a first upper plate and a first lower plate of the integral condenser illustrated in FIG. 12.
Figure 14:
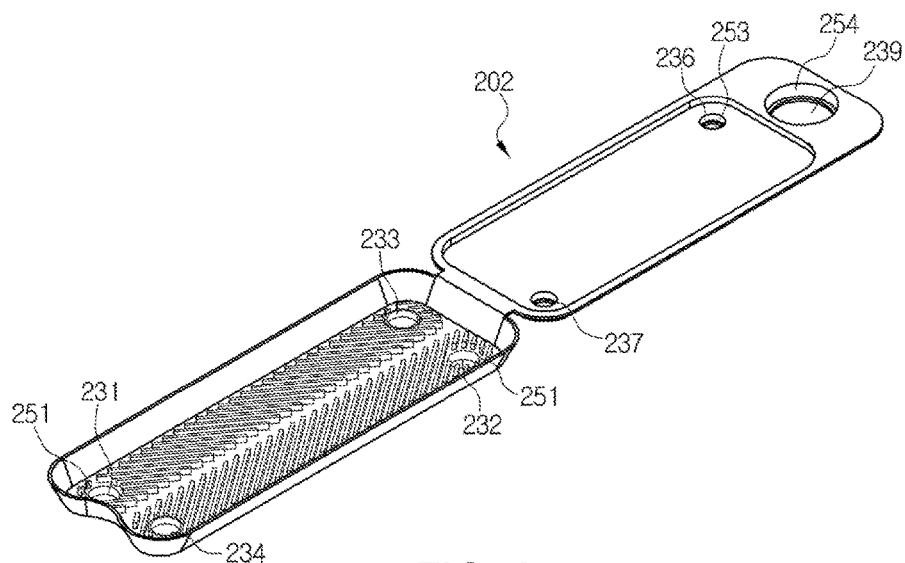

Meanwhile, the integral condenser 100 according to an exemplary embodiment illustrated in FIG. 12 is configured to include refrigerant plates 200 illustrated in FIGS. 13 and 14 and coolant plates 300 illustrated in FIGS. 10 and 11.

That is, as illustrated in FIGS. 13 and 14, the refrigerant plate 200 is formed so that the seventh communication hole 237 formed at one side adjacent to the refrigerant channel part 110 for a water cooling condenser and the sixth communication hole 236 formed at the other side among the fifth to eighth communication holes 235 to 238 are opened, and the fifth communication hole 235 and the eighth communication holes 238 among the fifth to eighth communication holes 235 to 238 are closed, includes the sixth communication channel part 246 and the seventh communication channel part 247 formed by allowing the sixth communication holes 236 and the seventh communication holes 237 of a plurality of stacked refrigerant plates 200 to be in communication with each other, respectively, by the third bonding parts 253 in the region in which the refrigerant channel part 120 for an air cooling condenser is formed, and partition parts are formed in predetermined regions of the sixth communication channel part 246 and the seventh communication channel part 247, such that the first flow part 260, which is the condensing region A1, and the second flow part 270, which is the excessive cooling region A2, are separated from each other in the height direction.

Here, the first flow part 260 may be disposed above the second flow part 270.

A flow of the refrigerant will be described with reference to FIGS. 7 and 12.

First, the refrigerant introduced through the first refrigerant inlet 211 connected to the first communication hole 231 flows to the refrigerant channel part 110 for a water cooling condenser of the refrigerant plate 200, moves to the fifth communication hole 235 through the first connection part 510, and then passes through the first flow part 260 of the refrigerant channel part 120 for an air cooling condenser.

Next, the refrigerant passing through the first flow part 260 passes through the second connection part 520, passes through the gas-liquid separator 140, is circulated through the second flow part 270, and is then discharged to the second refrigerant outlet 222 connected to the seventh communication hole 237.

In this case, the coolant is introduced through the coolant inlet 311 connected to the third communication hole 233, passes through the coolant plates 300, and is then discharged to the coolant outlet 312 connected to the fourth communication hole 234.

The coolant inlet 311 is formed at an opposite side to a side at which the first refrigerant inlet 211 is formed. That is, it is preferable that when the coolant inlet is formed at one side in the length direction of a refrigerant plate region in which the refrigerant channel part 110 for a water cooling condenser is formed, the first refrigerant inlet is formed at the other side in the length direction to allow the coolant to flow in an opposite direction to a direction of the refrigerant.

In addition, a direction in which the coolant is introduced is opposite to a direction in which the coolant is discharged, and the coolant may flow in a u-flow form and be then discharged.

Flow paths of the refrigerant and the coolant may be modified depending on positions of the first refrigerant inlet 211, the first refrigerant outlet 212, the second refrigerant inlet 221, the second refrigerant outlet 222, the coolant inlet 311, and the coolant outlet 312, and positions and the number of partition parts.

Figure 15:
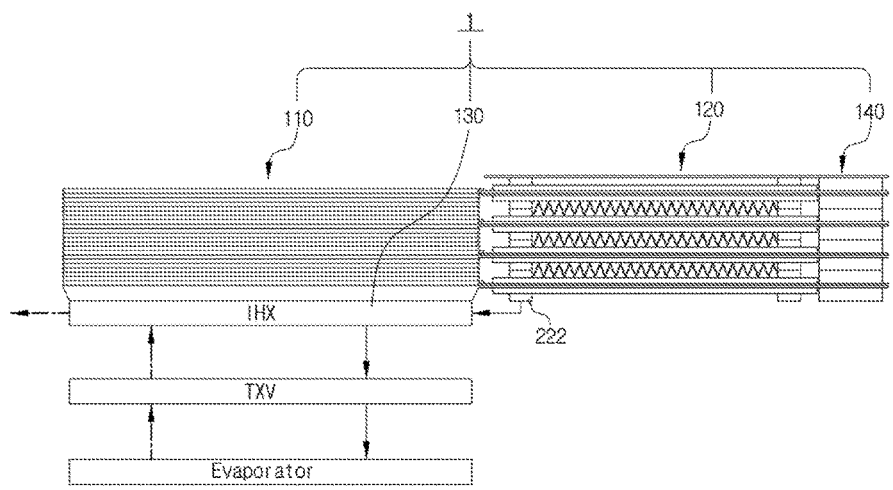
FIGS. 15 to 17 are schematic views illustrating various exemplary embodiments in which an auxiliary condenser is configured in an integral condenser according to the present invention.
Figure 16:
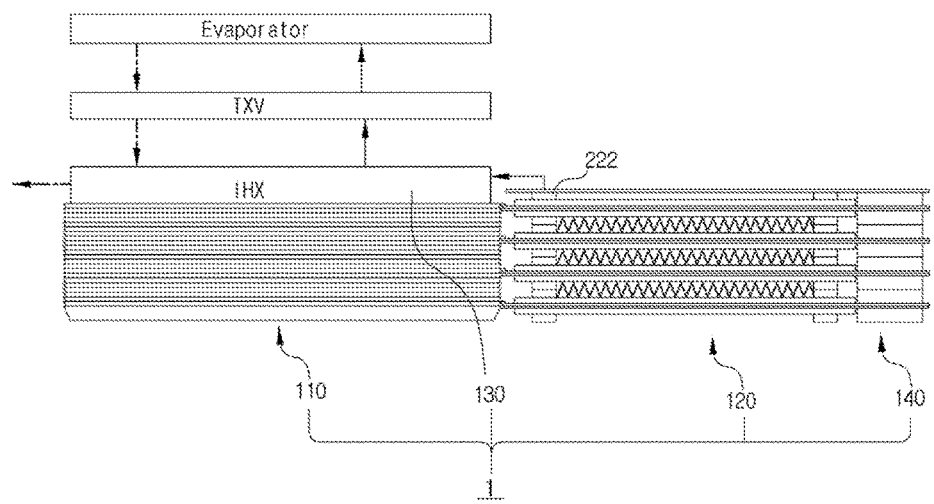
Figure 17:
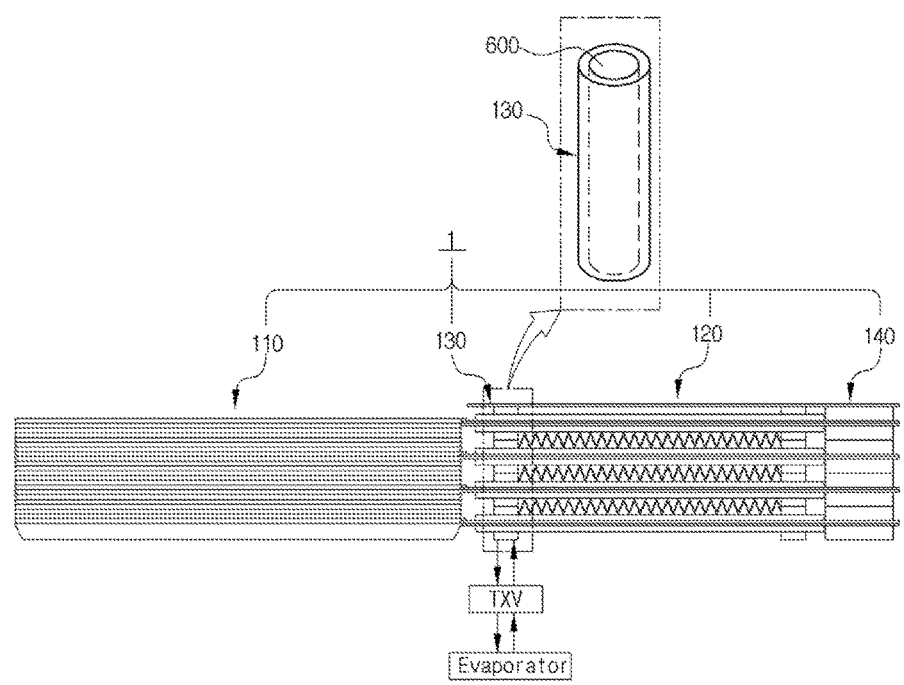

Meanwhile, as illustrated in FIGS. 15 to 17, the air conditioner system 1 for a vehicle according to the present invention may include an auxiliary heat exchanger I connected between the integral condenser 100 and the expansion valve and heat-exchanging the refrigerant discharged from the integral condenser 100 and the refrigerant discharged from the evaporator with each other.

In FIGS. 15 and 16, the auxiliary heat exchanger I additionally stacked and formed on the uppermost end or the lowermost end of the refrigerant plate 200 forming the refrigerant channel part 110 for a water cooling condenser is illustrated.

In this case, the auxiliary heat exchanger I may be simply formed integrally with the integral condenser 100 only by additionally stacking a plate on the uppermost end or the lowermost end of the refrigerant plate 200 and connecting a channel to the second refrigerant outlet 222 so that the refrigerant discharged from the second refrigerant outlet 222 is introduced, such that assembling and connection structures between the integral condenser and the auxiliary heat exchanger may become simpler as compared with a case in which the auxiliary heat exchanger I is formed as a separate component in the related art.

As another exemplary embodiment, as illustrated in FIG. 17, the auxiliary heat exchanger I may be inserted into any one communication channel part connected to the second refrigerant outlet among the fifth to eighth communication channels parts 245 to 248 formed by allowing the fifth to eighth communication holes 235 to 238 of the plurality of stacked refrigerant plates 200 to be in communication with each other, respectively, by the third bonding parts 253 in the region in which the refrigerant channel part 120 for an air cooling condenser is formed, thereby forming a dual-pipe form.

Referring to FIG. 17, the auxiliary heat exchanger I is formed by further including a flow pipe 600 inserted into the seventh communication channel part that is in communication with the seventh communication hole 237 connected to the second refrigerant outlet 222, a refrigerant introduced from the outside flows into the flow pipe 600, and the refrigerant that passes through the second flow part 270 and is to be discharged to the second refrigerant outlet 222 flows to a space between the flow pipe 600 and the communication channel part, such that the refrigerants may be heat-exchanged with each other.

As another exemplary embodiment, as illustrated in FIGS. 21 to 31, in the integral condenser 100, a first upper plate 201 and a first lower plate 202 are stacked and formed as a pair in the refrigerant plate 200, and an internal space formed by stacking the first upper plate 201 and the first lower plate 202 is separated in the width direction, such that a refrigerant channel part 110 for a water cooling condenser and a refrigerant channel part 120 for an air cooling condenser may be formed.

Here, the refrigerant channel part 110 for a water cooling condenser and the refrigerant channel part 120 for an air cooling condenser may be separated from each other by forming a division part 255 protruding inwardly in a region in which they are separated from each other.

In addition, the coolant plate 300 may include an air guiding part 320 of which a surface positioned on a front surface in the air blowing direction protrudes forwardly from an edge toward a central portion so that blown air is guided and flows from the center to the edge, and it is preferable the air guiding part 320 is formed in a streamline shape.

The coolant plates 300 are stacked multiple times alternately with the refrigerant plates 200 configuring the refrigerant channel parts 110 for a water cooling condenser, and are formed so that a coolant flows therein.

The coolant plate 300 includes a second upper plate 301 and a second lower plate 302 formed as a pair, and the coolant may flow to an internal space of the coolant plate 300.

A configuration of the present invention will be described in detail. The integral condenser 100 may be configured to include a first refrigerant inlet 211 formed in a region in which the refrigerant channel part 110 for a water cooling condenser is formed and having a refrigerant introduced therethrough and a first refrigerant outlet 212 formed in the region in which the refrigerant channel part 110 for a water cooling condenser is formed and discharging the refrigerant; a second refrigerant inlet 221 formed in a region in which the refrigerant channel part 120 for an air cooling condenser is formed and having the refrigerant introduced from the first refrigerant outlet 212 therethrough and a second refrigerant outlet 222 formed in the region in which the refrigerant channel part 120 for an air cooling condenser is formed and discharging the refrigerant; and a coolant inlet 311 formed in the coolant plate 300 and having a coolant introduced therethrough and the coolant outlet 312 formed in the coolant plate 300 and discharging the coolant.

In this case, the refrigerant plate 200 and the coolant plate 300 include first communication holes 231 and second communication holes 232 that are in communication with the first refrigerant inlet 211 and the first refrigerant outlet 212 in a stack direction to be hollowed so that the refrigerant flows to the refrigerant channel part 110 for a water cooling condenser, and the first communication holes 231 and the second communication holes 232 include first bonding parts 251 formed along circumferences thereof and protruding outwardly of the refrigerant plate 200.

In addition, the refrigerant plate 200 and the coolant plate 300 include third communication holes 233 and fourth communication holes 234 that are in communication with the coolant inlet 311 and the coolant outlet 312 in the stack direction to be hollowed so that the coolant flows to the coolant plate 300, and the third communication holes 233 and the fourth communication holes 234 include second bonding parts 252 formed along circumferences thereof and protruding outwardly of the coolant plate 300.

Referring to FIGS. 25 to 28, first, the refrigerant plate 200 may be formed by stacking the first upper plate 201 and the first lower plate 202 formed as a pair. In this case, the refrigerant may flow to an internal space formed by assembling one pair of first upper plate 201 and first lower plate 202, and a space to which the refrigerant flows is called an inner side and an external space is called an outer side.

The refrigerant plate 200 includes the first communication hole 231, the second communication hole 232, the third communication hole 233, and the fourth communication hole 234 hollowed and formed in a region in which the refrigerant channel part 110 for a water cooling condenser is formed, and the coolant plate 300 also includes the first communication hole 231, the second communication hole 232, the third communication hole 233, and the fourth communication hole 234 hollowed and formed in a region corresponding to the above-mentioned region.

In addition, the refrigerant plate 200 includes fifth and sixth communication holes 235 and 236 that are in communication with the second refrigerant inlet 221 and the second refrigerant outlet 222 in the stack direction to be hollowed so that the refrigerant flows to the refrigerant channel part 120 for an air cooling condenser, and the fifth and sixth communication holes 235 and 236 include third bonding parts 253 formed along circumferences thereof and protruding outwardly of the refrigerant plate 200.

An exemplary embodiment in which the first communication hole 231 is connected to the first refrigerant inlet 211 and the second communication hole 232 is connected to the first refrigerant outlet 212 has been illustrated in FIGS. 25 to 28, but the first communication hole 231 and the second communication hole 232 may be connected as opposed to the exemplary embodiment described above, and positions of the first communication hole 231 and the second communication hole 232 may also be modified.

In addition, an exemplary embodiment in which the third communication hole 233 is connected to the coolant inlet 311 and the fourth communication hole 234 is connected to the coolant outlet 312 has been illustrated in FIGS. 25 to 28, but may also be modified.

Hereinafter, a description will be provided on the basis of the exemplary embodiment illustrated in FIGS. 25 to 28 for convenience of explanation.

Figure 25:
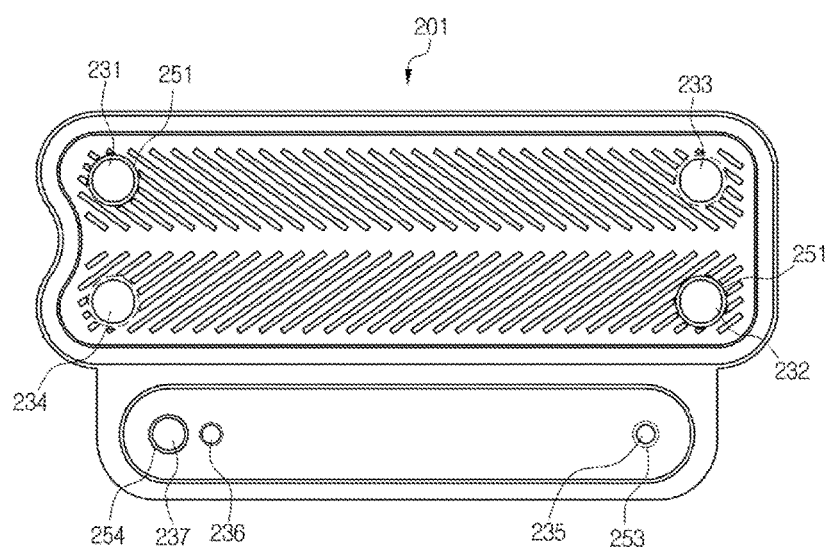
FIG. 25 is a plan view illustrating a first upper plate of an integral condenser according to an exemplary embodiment of the present invention.
Figure 26:
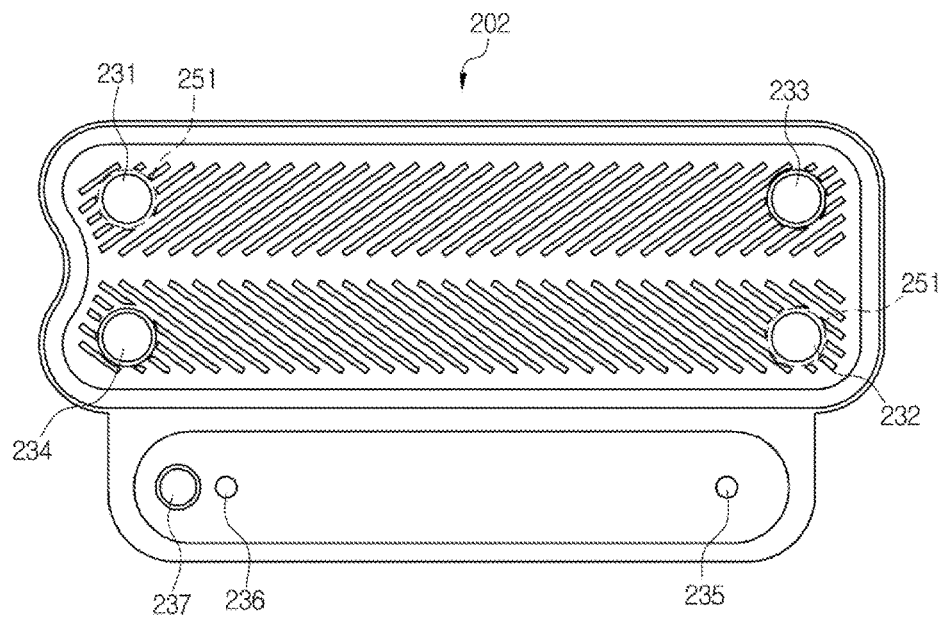
FIG. 26 is a plan view illustrating a first lower plate of an integral condenser according to an exemplary embodiment of the present invention.

As illustrated in FIGS. 25 and 26, the refrigerant plate 200 formed by stacking one pair of first upper plate 201 and first lower plate 202 includes the first bonding parts 251 formed along circumferential surfaces of the first communication hole 231 and the second communication hole 232 and protruding outwardly of the refrigerant plate 200 and the second bonding parts 252 formed along circumferential surfaces of the third communication hole 233 and the fourth communication hole 234 and protruding inwardly of the refrigerant plate 200. Only the refrigerant flows into the refrigerant plate 200, and the coolant does not flow into the refrigerant plate 200, by the first bonding parts 251 and the second bonding parts 252.

Figure 27:
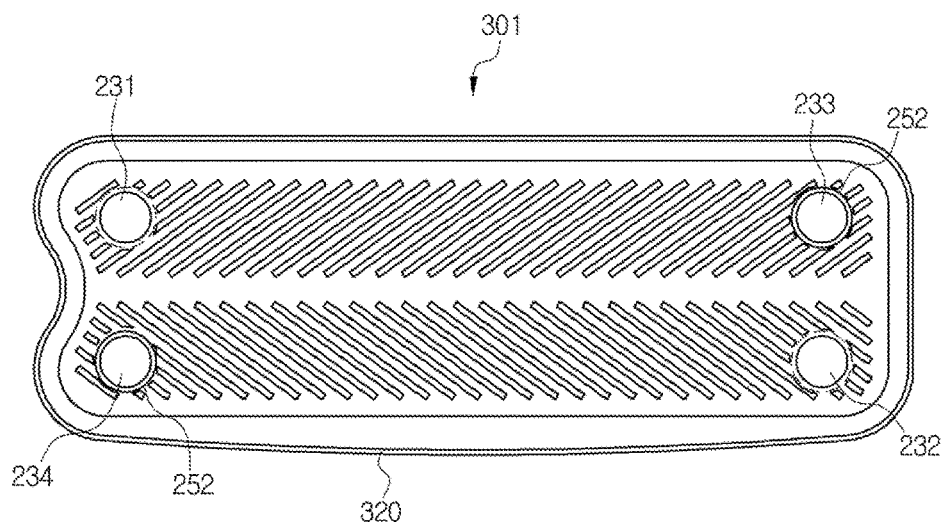
FIG. 27 is a plan view illustrating a second upper plate of an integral condenser according to an exemplary embodiment of the present invention.
Figure 28:
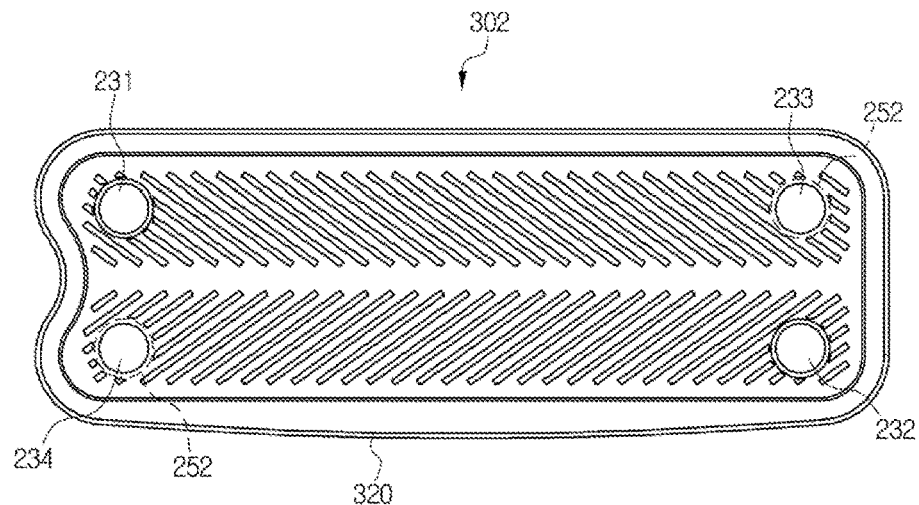
FIG. 28 is a plan view illustrating a second lower plate of an integral condenser according to an exemplary embodiment of the present invention.

As illustrated in FIGS. 27 and 28, the coolant plate 300 formed by stacking one pair of second upper plate 301 and second lower plate 302 includes the first bonding parts 251 formed along circumferential surfaces of the first communication hole 231 and the second communication hole 232 and protruding inwardly of the coolant plate 300 and the second bonding parts 252 formed along circumferential surfaces of the third communication hole 233 and the fourth communication hole 234 and protruding outwardly of the coolant plate 300. Only the coolant flows into the coolant plate 300, and the refrigerant does not flow into the coolant plate 300, by the first bonding parts 251 and the second bonding parts 252.

In addition, the refrigerant plate 200 includes the fifth communication hole 235 and the sixth communication hole 236 formed at a side at which the refrigerant channel part 120 for an air cooling condenser is formed, and may include a fifth communication channel part 245 and a sixth communication channel part 246 through which the refrigerant may flow to the fifth and sixth communication holes 235 and 236 of the refrigerant plate 200 stacked to neighbor to the refrigerant plate 200 in a height direction by the third bonding parts 253 protruding outwardly of the refrigerant plate 200 along circumferential surfaces of the fifth and sixth communication holes 235 and 236.

In this case, it is preferable that the third bonding part 253 protrudes by ½ of a height of the heat radiation fin 400, such that when the third bonding part 253 of the second upper plate 301 and the third bonding part 253 of the second lower plate 302 is in contact with and are coupled to each other, the heat radiation fin 400 is interposed in a space between the third bonding parts 253 in the length direction.

Meanwhile, in the integral condenser 100, a gas-liquid separator 140 provided in an existing condenser and serving to separate the refrigerant into a gas-phase refrigerant and a liquid-phase refrigerant may be formed integrally with the refrigerant plate 200 through a seventh communication hole 237 formed on the refrigerant plate 200 or may be formed as a component separate from the refrigerant plate 200 and be connected to the refrigerant plate 200 through a connection member.

In the case in which the gas-liquid separator 140 is formed integrally with the refrigerant plate 200, the gas-liquid separator 140 is formed in a region in which the refrigerant channel part 120 for an air cooling condenser is formed, and may be formed at one side end portion positioned at a side at which the first refrigerant outlet 212 through which the refrigerant passing through the refrigerant channel part 110 for a water cooling condenser is discharged is formed or be formed at the other side end portion positioned at a side at which the second refrigerant outlet 222 through which the refrigerant passing through the refrigerant channel part 120 for an air cooling condenser is discharged is formed.

A description will be provided with reference to FIG. 26. The refrigerant plate 200 may include the seventh communication hole 237 hollowed in a region adjacent to one side end portion of a side at which the refrigerant channel part 120 for an air cooling condenser is formed, that is, a left side end portion in FIG. 26 so that the refrigerant flows, and the seventh communication hole 237 includes a fourth bonding part 254 formed along a circumference thereof and protruding outwardly of the refrigerant plate 200.

That is, the fourth bonding part 254 protrudes upwardly from a circumferential surface of the seventh communication hole 237 formed in the first upper plate 201, and protrudes downwardly from a circumferential surface of the seventh communication hole 237 formed in the first lower plate 202.

The fourth bonding part 245 is formed at the same height as that of the third bonding part 253 to allow the seventh communication holes 237 of the plurality of refrigerant plates 200 stacked through assembling to be in communication with each other, thereby forming a pipe-type gas-liquid separator 140 to which the refrigerant may flow in the height direction.

Figure 23:
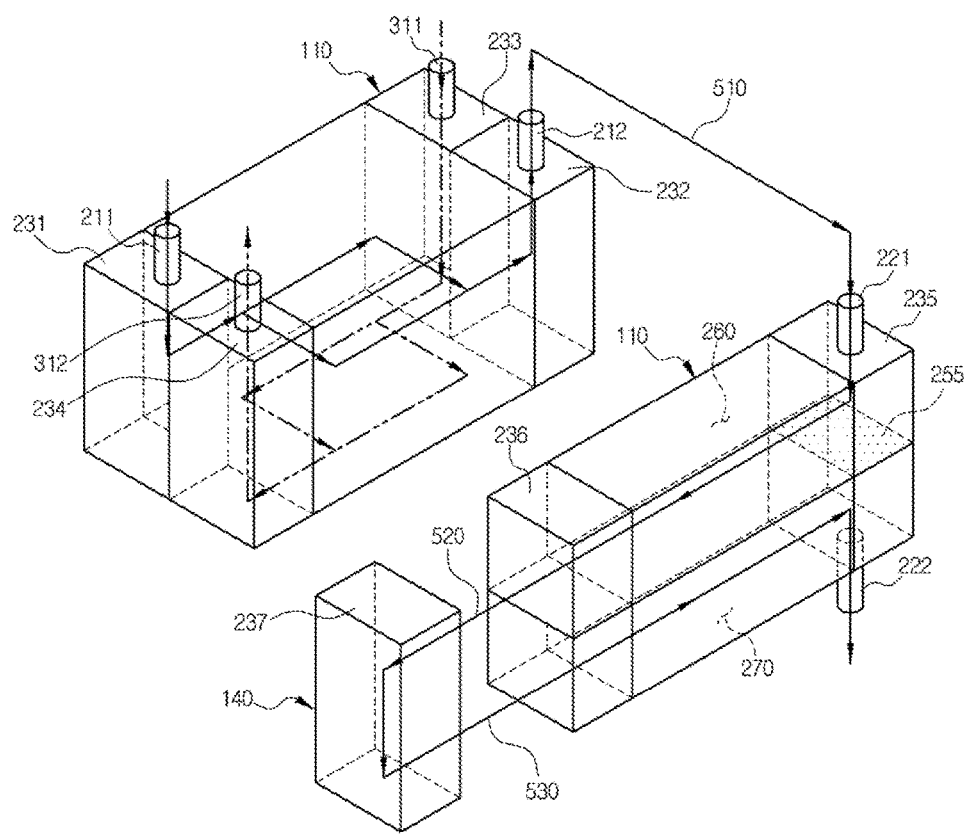
FIG. 23 is a schematic view illustrating refrigerant and coolant flow paths in an integral condenser according to an exemplary embodiment of the present invention.
Figure 24:
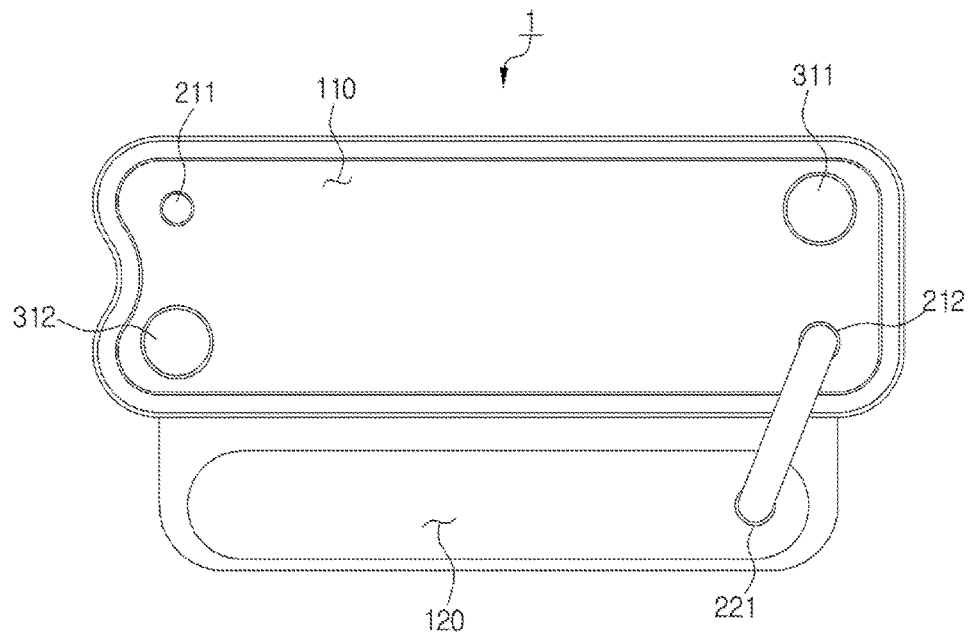
FIG. 24 is a plan view of an integral condenser according to an exemplary embodiment of the present invention.
Figure 29:
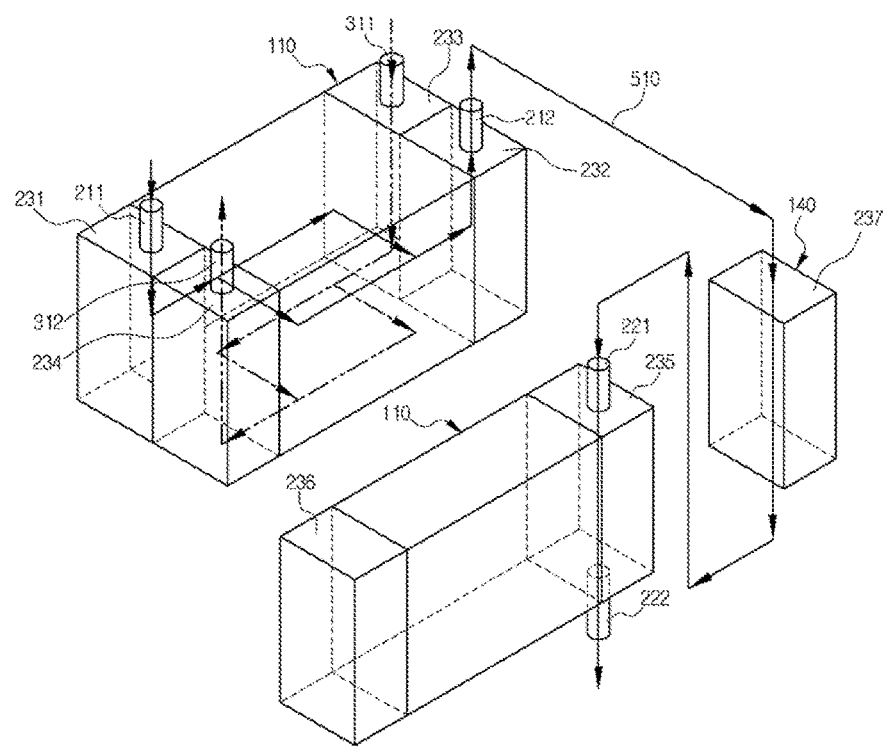
FIGS. 29 and 30 are schematic views illustrating various exemplary embodiments in which a gas-liquid separator is configured in the present invention and refrigerant and coolant flow paths according to the various exemplary embodiments.
Figure 30:
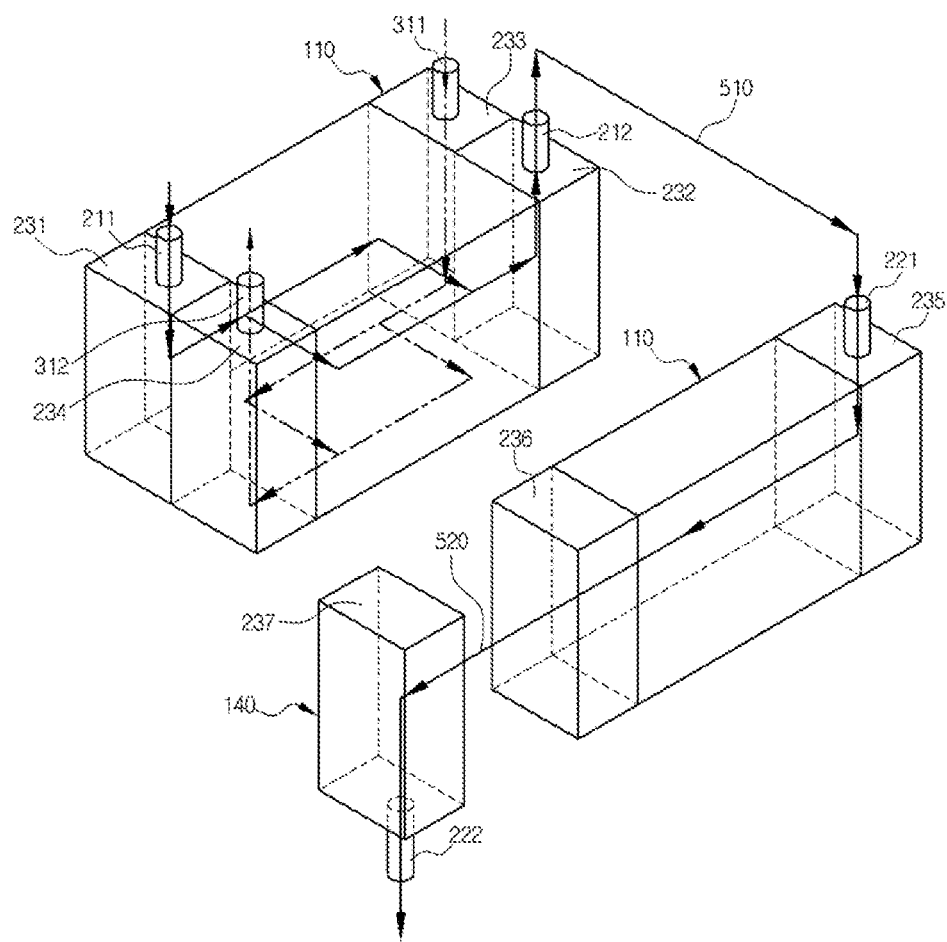

In the integral condenser 100, a position of the gas-liquid separator 140 may be variously modified, as illustrated in FIGS. 23, 28, and 29.

In the integral condenser 100 illustrated in FIG. 23, the gas-liquid separator 140 is formed at the other side end portion positioned at a side at which the second refrigerant outlet 222 through which the refrigerant passing through the refrigerant channel part 120 for an air cooling condenser is discharged is formed, such that the integral condenser 100 has a path through which the refrigerant passing through the refrigerant channel part 120 for an air cooling condenser passes through a condensing region A1 of the refrigerant channel part 120 for an air cooling condenser and is introduced into the gas-liquid separator 140 and the refrigerant discharged from the gas-liquid separator 140 passes through an excessive cooling region A2 of the refrigerant channel part 120 for an air cooling condenser and is then discharged to the outside.

In this case, the refrigerant may flow through one path within the refrigerant channel part 110 for a water cooling condenser, which is the water cooling region, and the refrigerant channel part 120 for an air cooling condenser, which is the air cooling region, but may flow through two or more paths. This may be variously modified.

As another exemplary embodiment, in the integral condenser 100 illustrated in FIG. 28, the gas-liquid separator 140 is formed at one side end portion positioned at a side at which the first refrigerant outlet 212 through which the refrigerant passing through the refrigerant channel part 110 for a water cooling condenser is discharged is formed, such that the integral condenser 100 has a flow path through which the refrigerant passing through the refrigerant channel part 110 for a water cooling condenser is separated into a gas-phase refrigerant and a liquid-phase refrigerant in the gas-liquid separator 140 and the refrigerant discharged from the gas-liquid separator 140 passes through the refrigerant channel part 120 for an air cooling condenser and is then discharged to the outside.

As still another exemplary embodiment, in the integral condenser 100 illustrated in FIG. 29, the gas-liquid separator 140 is formed at the other side end portion of the refrigerant channel part 120 for an air cooling condenser, such that the integral condenser 100 has a flow path through which the refrigerant passing through the refrigerant channel part 110 for a water cooling condenser passes through the refrigerant channel part 120 for an air cooling condenser and is then introduced into the gas-liquid separator 140 and the refrigerant discharged from the gas-liquid separator 140 is discharged to the outside.

In this case, in the integral condenser 100 illustrated in FIGS. 23, 28, and 29, the refrigerant passing through all of the water cooling region, the air cooling region, and the gas-liquid separator 140 may be introduced into an internal heat exchanger IHX, which is an auxiliary heat exchangers I to be described below.

Meanwhile, the integral condenser 100 may be configured to include a first connection part 510 formed between the refrigerant channel part 110 for a water cooling condenser and the refrigerant channel part 120 for an air cooling condenser and having the refrigerant movable therethrough, a second connection part 520 connecting the first flow part 260 and the gas-liquid separator 140 to each other, and a third connection part 530 connecting the gas-liquid separator 140 and the second flow part 270 to each other, as illustrated in FIG. 23.

The first to third connection parts 510, 520, and 530 may be formed in an external pipe shape. In this case, the first connection part 510 may be formed so that the first refrigerant outlet 212 and the second refrigerant inlet 221 are connected to each other through an external pipe, the second connection part 520 may form a channel so that the fifth communication hole 235 or the sixth communication hole 236 of the first flow part 260 and the seventh communication hole 237 are connected to each other in the refrigerant plate 200 positioned at the uppermost end, and the third connection part 530 may form a channel so that the fifth communication hole 235 or the sixth communication hole 236 of the second flow part 270 and the seventh communication hole 237 are connected to each other in the refrigerant plate 200 positioned at the lowermost end.

As another exemplary embodiment, in the integral condenser 100, the first to third connection parts 510, 520, and 530 may be formed in the refrigerant plate 200. In this case, the first connection part 510 may be formed so that the first refrigerant outlet 212 and the second refrigerant inlet 221 are connected to each other, the second connection part 520 may form a channel so that the fifth communication hole 235 or the sixth communication hole 236 of the first flow part 260 and the seventh communication hole 237 are connected to each other in the refrigerant plate 200, and the third connection part 530 may form a channel so that the fifth communication hole 235 or the sixth communication hole 236 of the second flow part 270 and the seventh communication hole 237 are connected to each other in the refrigerant plate 200.

In addition, various modifications may be made in the integral condenser 100. For example, the first connection part 510 is formed in an external pipe shape and the second connection part 520 and the third connection part 530 are formed in the refrigerant plate 200 or only at least any one of the first to third connection parts 510, 520, and 530 is formed in an external pipe shape and the others are formed in the refrigerant plate 200.

Meanwhile, in the integral condenser 100, a channel of the coolant or the refrigerant flowing in the integral condenser 100 may be variously modified, which will be described with reference to FIG. 23.

In the integral condenser 100 of FIG. 23, a channel in an exemplary embodiment in which the gas-liquid separator 140 is formed at the other side end portion positioned at a side at which the second refrigerant outlet 222 through which the refrigerant passing through the refrigerant channel part 120 for an air cooling condenser is discharged is formed is illustrated.

In the integral condenser 100 of FIG. 23, the refrigerant channel part 120 for an air cooling condenser may be separated into an upper region and a lower region, the first flow part 260 formed in the upper region may be used as a condensing region A1, and after the refrigerant passing through the upper region moves to the gas-liquid separator 140, a liquid-phase refrigerant is introduced from a lower end, thereby allowing the second flow part 270 formed in the lower region to be used as an excessive cooling region A2.

In this case, the integral condenser 100 is configured to include the fifth communication channel part 245 and the sixth communication channel part 246 formed by allowing the fifth communication holes 235 and the sixth communication holes 236 of a plurality of stacked refrigerant plates 200 to be in communication with each other, respectively, by the third bonding parts 253 in the region in which the refrigerant channel part 120 for an air cooling condenser is formed, partition parts are formed in predetermined regions of the fifth communication channel part 245 and the sixth communication channel part 246, such that the first flow part 260 and the second flow part 270 are separated from each other in the height direction, and the first flow part 260 is disposed above the second flow part 270.

A flow of the refrigerant will be described with reference to FIG. 23.

First, the refrigerant introduced through the first refrigerant inlet 211 connected to the first communication hole 231 flows to the refrigerant channel part 110 for a water cooling condenser of the refrigerant plate 200, moves to the fifth communication hole 235 through the first connection part 510 connected to the first refrigerant outlet 212 formed at an upper side of the refrigerant plate 200, and then passes through the first flow part 260 of the refrigerant channel part 120 for an air cooling condenser.

Next, the refrigerant passing through the first flow part 260 passes through the second connection part 520, passes through the gas-liquid separator 140, is circulated through the second flow part 270, and is then discharged to the second refrigerant outlet 222 connected to the fifth communication hole 235.

In this case, the coolant is introduced through the coolant inlet 311 connected to the third communication hole 233, passes through the coolant plates 300, and is then discharged to the coolant outlet 312 connected to the fourth communication hole 234.

The coolant inlet 311 is formed at an opposite side to a side at which the first refrigerant inlet 211 is formed. That is, it is preferable that when the coolant inlet 311 is formed at one side in the length direction of a refrigerant plate region in which the refrigerant channel part 110 for a water cooling condenser is formed, the first refrigerant inlet is formed at the other side in the length direction to allow the coolant to flow in an opposite direction to a direction of the refrigerant.

In addition, it is preferable that a direction in which the refrigerant and the coolant are introduced is opposite to a direction in which the refrigerant and the coolant are discharged, the coolant flows in a u-flow form, and the refrigerant and the coolant form u-flows in opposite directions.

Flow paths of the refrigerant and the coolant may be modified depending on positions of the first refrigerant inlet 211, the first refrigerant outlet 212, the second refrigerant inlet 221, the second refrigerant outlet 222, the coolant inlet 311, and the coolant outlet 312, and positions and the number of partition parts.

As described above, during a period in which the refrigerant flows, the integral condenser 100 performs heat exchange between air blown from a front surface in the air flowing direction, that is, a front surface of a side at which the refrigerant channel part 120 for an air cooling condenser is formed and the refrigerant flowing in the refrigerant channel part 120 for an air cooling condense, and air passing through the heat radiation fin is guided and discharged to both edges along the air guiding part 320 of the coolant plate 300 interposed between the refrigerant channel parts 110 for a water cooling condenser.

In this case, in the integral condenser 100, air passing through the refrigerant channel part for an air cooling condenser may be used to cool the refrigerant channel part for a water cooling condenser, such that cooling performance may be additionally improved.

In addition, the integral condenser 100 may further include an auxiliary heat exchanger I additionally stacked and formed on the uppermost end or the lowermost end of the refrigerant plate 200 forming the refrigerant channel part 110 for a water cooling condenser, as illustrated in FIG. 31.

Therefore, in the integral condenser 100 of the air conditioner system for a vehicle according to the present invention, at least two heat exchangers may be formed integrally with each other through one-time brazing, such that pipe connection may be simplified and a package size may be significantly reduced, as compared with the related art in which two heat exchangers are separately formed.

In addition, in the present invention, channels of the refrigerant flowing between the regions serving as the air cooling condenser, the water cooling condenser, and the auxiliary heat exchanger may be formed through separate pipe connection, but may also be formed through internal channels of the plates, such that a pressure drop of the refrigerant is reduced and an unnecessary pressure drop is reduced, thereby making it possible to improve heat exchange efficiency.

The present invention is not limited to the above-mentioned exemplary embodiments, but may be variously applied. In addition, the present invention may be variously modified by those skilled in the art to which the present invention pertains without departing from the gist of the present invention claimed in the claims.

[Detailed Description of Main Elements]

C: compressor
T: expansion valve
E: evaporator
I: auxiliary heat exchanger
P: refrigerant pipe
A1: condensing region    A2: excessive cooling region
100: integral condenser
110: refrigerant channel part for water cooling condenser
120: refrigerant channel part for air cooling condenser
140: gas-liquid separator
200: refrigerant plate
201: first upper plate    202: first lower plate
211: first refrigerant inlet    212: first refrigerant outlet
221: second refrigerant inlet    222: second refrigerant outlet
231~239: first to ninth communication holes
245~248: fifth to eighth communication channel parts
251~254: first to fourth bonding parts
255: division part
256: partition part
260: first flow part    270: second flow part
300: coolant plate
301: second upper plate    302: second lower plate
311: coolant inlet    312: coolant outlet
400: heat radiation fin

[Detailed Description of Main Elements]

510~530: first to third connection parts
600: flow pipe

The invention claimed is:

1. An air conditioner system for a vehicle, comprising:
a compressor compressing a refrigerant;
an integral condenser comprising a water cooling region heat-exchanging the refrigerant compressed in and discharged from the compressor with a coolant to condense the refrigerant and an air cooling region heat-exchanging the refrigerant with air to condense the refrigerant, wherein the water cooling region and the air cooling region are formed integrally in a plate;
an expansion valve expanding the refrigerant condensed in and discharged from the integral condenser; and
an evaporator evaporating the refrigerant expanded in and discharged from the expansion valve,
wherein the compressor, the integral condenser, the expansion valve, and the evaporator are connected to each other by refrigerant pipes, wherein the integral condenser is a plate-type heat exchanger, and includes the water cooling region and the air cooling region formed on one plate.

2. The air conditioner system for a vehicle of claim 1, wherein the integral condenser includes:
refrigerant plates formed by stacking first upper plates and first lower plates formed as pairs, a region thereof being separated in a length direction of the refrigerant plates, such that refrigerant channel parts for a water cooling condenser configuring the water cooling region and refrigerant channel parts for the air cooling condenser configuring the air cooling region are formed;
coolant plates stacked alternately with the refrigerant plates configuring the refrigerant channel parts for the water cooling condenser to configure the water cooling region, and having the coolant flowing therein; and
heat radiation fins interposed in spaces between the refrigerant plates configuring the refrigerant channel parts for the air cooling condenser, and performing heat-exchange with air, and
the refrigerant passing through all of the refrigerant channel parts for the water cooling condenser is introduced into the refrigerant channel parts for the air cooling condenser.

3. The air conditioner system for a vehicle of claim 2, wherein the integral condenser includes:
a first refrigerant inlet formed in a region in which the refrigerant channel part for the water cooling condenser is formed and having a refrigerant introduced therethrough and a first refrigerant outlet formed in the region in which the refrigerant channel part for the water cooling condenser is formed and discharging the refrigerant;
a second refrigerant inlet formed in a region in which the refrigerant channel part for the air cooling condenser is formed and having the refrigerant introduced therethrough and a second refrigerant outlet formed in the region in which the refrigerant channel part for the air cooling condenser is formed and discharging the refrigerant; and
a coolant inlet formed in the coolant plate and having the coolant introduced therethrough and a coolant outlet formed in the coolant plate and discharging the coolant.

4. The air conditioner system for a vehicle of claim 3, wherein the coolant plate is formed by stacking a second upper plate and a second lower plate formed as a pair.

5. The air conditioner system for a vehicle of claim 4, wherein the refrigerant plate and the coolant plate include:
   first communication holes and second communication holes that are in communication with the first refrigerant inlet and the first refrigerant outlet in a stack direction to be hollowed so that the refrigerant flows to the refrigerant channel part for the water cooling condenser, the first communication holes and the second communication holes including first bonding parts formed along circumferences thereof and protruding outwardly of the refrigerant plate; and
   third communication holes and fourth communication holes that are in communication with the coolant inlet and the coolant outlet in the stack direction to be hollowed so that the coolant flows to the coolant plate, the third communication holes and the fourth communication holes including second bonding parts formed along circumferences thereof and protruding outwardly of the coolant plate.

6. The air conditioner system for a vehicle of claim 5, wherein the refrigerant plate further includes: fifth to eighth communication holes that are in communication with the second refrigerant inlet and the second refrigerant outlet in the stack direction to be hollowed so that the refrigerant flows to the refrigerant channel part for the air cooling condenser, the fifth to eighth communication holes including third bonding parts formed along circumferences thereof and protruding outwardly of the refrigerant plate.

7. The air conditioner system for a vehicle of claim 6, wherein the refrigerant plate further includes a ninth communication hole hollowed at one side end portion or another side end portion of a side at which the refrigerant channel part for the air cooling condenser is formed so that the refrigerant flows, the ninth communication hole including a fourth bonding part formed along a circumference thereof and protruding outwardly of the refrigerant plate.

8. The air conditioner system for a vehicle of claim 7, wherein in the refrigerant plate,
   a division part protruding inwardly of the refrigerant plate to divide a predetermined region of an internal space into a first flow part corresponding to a condensing region and a second flow part corresponding to an excessive cooling region in a width direction of the refrigerant plates is extended in the length direction in a region in which the fifth to eighth communication holes are not formed in a region in which the refrigerant channel part for the air cooling condenser is formed,
   the fifth communication hole and the sixth communication hole are disposed at the first flow part side at both side end portions of the division part, and
   the seventh communication hole and the eighth communication hole are disposed at the second flow part side at both side end portions of the division part.

9. The air conditioner system for a vehicle of claim 8, wherein in the integral condenser,
   the second flow part is disposed at a front side in an air blowing direction, and the first flow part is disposed at a rear side in the air blowing direction, and
   the refrigerant passing through the refrigerant channel part for the water cooling condenser is introduced into the first flow part through the second refrigerant inlet and is circulated through the first flow part, passes through a gas-liquid separator formed by allowing the ninth communication holes of a plurality of stacked refrigerant plates to be in communication with each other by the fourth bonding parts, is circulated through the second flow part, and is then discharged to the second refrigerant outlet.

10. The air conditioner system for a vehicle of claim 9, wherein the integral condenser further includes:
    a first connection part forming a channel so that the first refrigerant outlet and the second refrigerant inlet are connected to each other;
    a second connection part forming a channel so that the fifth communication hole or the sixth communication hole of the first flow part and the ninth communication hole are connected to each other in the refrigerant plate positioned at the uppermost end; and
    a third connection part forming a channel so that the seventh communication hole or the eighth communication hole of the second flow part and the ninth communication hole are connected to each other in the refrigerant plate positioned at the lowermost end, and
    the first to third connection parts are formed in an external pipe shape.

11. The air conditioner system for a vehicle of claim 9, wherein the integral condenser further includes:
    a first connection part forming a channel so that the first refrigerant outlet and the second refrigerant inlet are connected to each other;
    a second connection part forming a channel so that the fifth communication hole or the sixth communication hole of the first flow part and the ninth communication hole are connected to each other in the refrigerant plate positioned in a predetermined upper region; and
    a third connection part forming a channel so that the seventh communication hole or the eighth communication hole of the second flow part and the ninth communication hole are connected to each other in the refrigerant plate positioned in a predetermined lower region, and
    the first to third connection parts are formed in the refrigerant plate.

12. The air conditioner system for a vehicle of claim 7, wherein the integral condenser is formed so that the seventh communication hole formed at one side adjacent to the refrigerant channel part for the water cooling condenser and the sixth communication hole formed at the other side among the fifth to eighth communication holes are opened, and the fifth communication hole and the eighth communication holes among the fifth to eighth communication holes are closed, and includes a sixth communication channel part and a seventh communication channel part formed by allowing the sixth communication holes and the seventh communication holes of a plurality of stacked refrigerant plates to be in communication with each other, respectively, by the third bonding parts in the region in which the refrigerant channel part for the air cooling condenser is formed, partition parts are formed in predetermined regions of the sixth communication channel part and the seventh communication channel part, such that a first flow part corresponding to a condensing region and a second flow part corresponding to an excessive cooling region are separated from each other in a height direction, and the first flow part is disposed above the second flow part.

13. The air conditioner system for a vehicle of claim 1, wherein the integral condenser is disposed so that the refrigerant channel part for the air cooling condenser is formed on a front surface in an air blowing direction, and the refrigerant channel part for the water cooling condenser is formed on a rear surface in the air blowing direction.

14. The air conditioner system for a vehicle of claim 13, wherein the coolant plate includes an air guiding part of which a surface positioned on a front surface in the air blowing direction protrudes forwardly from an edge toward a central portion so that blown air is guided and flows from the center to the edge.

15. The air conditioner system for a vehicle of claim 14, wherein the integral condenser includes a blowing fan installed on a front surface of a side at which the refrigerant channel parts for the air cooling condenser are formed.

16. The air conditioner system for a vehicle of claim 2, wherein the integral condenser includes a gas-liquid separator further formed on one plate.

17. The air conditioner system for a vehicle of claim 16, wherein the gas-liquid separator is formed at one side end portion of the refrigerant channel parts for the air cooling condenser corresponding to a space between the refrigerant channel part for the water cooling condenser and the refrigerant channel parts for the air cooling condenser, or is formed at another side end portion of the refrigerant channel parts for the air cooling condenser.

18. The air conditioner system for a vehicle of claim 17, wherein in the integral condenser, the gas-liquid separator is formed at one side end portion of the refrigerant channel parts for the air cooling condenser corresponding to the space between the refrigerant channel part for the water cooling condenser and the refrigerant channel parts for the air cooling condenser, such that the refrigerant passing through the refrigerant channel part for the water cooling condenser is separated into a gas-phase refrigerant and a liquid-phase refrigerant in the gas-liquid separator and the refrigerant discharged from the gas-liquid separator passes through the refrigerant channel part for the air cooling condenser and is then discharged to the outside.

19. The air conditioner system for a vehicle of claim 17, wherein in the integral condenser, the gas-liquid separator is formed at the other side end portion of the refrigerant channel part for the air cooling condenser, such that the refrigerant passing through the refrigerant channel part for the water cooling condenser passes through a condensing region of the refrigerant channel part for the air cooling condenser and is then introduced into the gas-liquid separator and the refrigerant discharged from the gas-liquid separator passes through an excessive cooling region of the refrigerant channel part for the air cooling condenser and is then discharged to the outside.

20. The air conditioner system for a vehicle of claim 17, wherein in the integral condenser, the gas-liquid separator is formed at the other side end portion of the refrigerant channel part for the air cooling condenser, such that the refrigerant passing through the refrigerant channel part for the water cooling condenser passes through the refrigerant channel part for the air cooling condenser and is then introduced into the gas-liquid separator and the refrigerant discharged from the gas-liquid separator is discharged to the outside.

21. The air conditioner system for a vehicle of claim 1, further comprising an auxiliary heat exchanger connected between the integral condenser and the expansion valve and heat-exchanging the refrigerant discharged from the integral condenser and the refrigerant discharged from the evaporator with each other.

22. The air conditioner system for a vehicle of claim 21, wherein the auxiliary heat exchanger is additionally stacked and formed on the uppermost end or the lowermost end of the refrigerant plate in which the refrigerant channel part for the water cooling condenser is formed.

* * * * *